(12) United States Patent  (10) Patent No.: US 7,454,116 B2
Clark et al.  (45) Date of Patent: Nov. 18, 2008

(54) WALL MOUNT CHASSIS

(75) Inventors: Gordon P. Clark, Eden Prairie, MN (US); Loren J. Mattson, Richfield, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/801,813

(22) Filed: May 11, 2007

(65) Prior Publication Data
US 2007/0212011 A1 Sep. 13, 2007

Related U.S. Application Data

(60) Division of application No. 11/054,774, filed on Feb. 8, 2005, now Pat. No. 7,233,732, which is a continuation of application No. 10/268,064, filed on Oct. 8, 2002, now Pat. No. 6,912,349.

(51) Int. Cl.
*G02B 6/00* (2006.01)
(52) U.S. Cl. ............... 385/136; 385/134; 385/135; 439/445; 439/499
(58) Field of Classification Search ......... 385/134–136, 385/147; 174/50, 52.1, 65 R, 72 A, 60, 61, 174/DIG. 9; 439/445, 499
See application file for complete search history.

(56) References Cited

U.S. PATENT DOCUMENTS

| | | | |
|---|---|---|---|
| 4,850,901 A | 7/1989 | Smith et al. | |
| 5,459,808 A | 10/1995 | Keith | |
| 5,828,807 A | 10/1998 | Tucker et al. | |
| 5,982,972 A | 11/1999 | Tucker et al. | |
| 6,036,529 A | 3/2000 | Brown et al. | |
| 6,363,198 B1 | 3/2002 | Braga et al. | |
| 6,438,308 B1 | 8/2002 | Philips et al. | |
| 6,483,029 B1 | 11/2002 | Lutz, Jr. | |
| 6,515,227 B1 | 2/2003 | Massey et al. | |
| 6,553,172 B2 | 4/2003 | Lortie et al. | |
| 6,621,975 B2 * | 9/2003 | Laporte et al. | 385/135 |

(Continued)

OTHER PUBLICATIONS

Homeworx HWX Transmission System; HWX 1310/1550 nm Equipment Shelf; ADC Broadband Communications (1996).

(Continued)

*Primary Examiner*—Sung Pak
*Assistant Examiner*—Daniel Petkovsek
(74) *Attorney, Agent, or Firm*—Merchant & Gould P.C.

(57) ABSTRACT

A wall mount chassis includes circuitry for telecommunications signals. The chassis includes a rear wall mountable to a vertical wall, and first and second sides. Each side includes a hinged cover. Each cover includes an access window for viewing an opposite side of the cover. On one side of the chassis is positioned signal converter cards for converting between optical and electrical signals. On an opposite side of the chassis are positioned one or more electrical power cards providing an access location for power to the circuitry. A CPU card can also be provided on the same side as the power card. An interior of the chassis includes a back plane positioned between the converter cards and the power and CPU cards wherein the back plane is perpendicular to the converter cards and power and CPU cards. A cable spool is positioned adjacent one of the sides for cable management. Cable clips are provided for securably retaining one or more cables adjacent each of the first and second sides.

5 Claims, 27 Drawing Sheets

U.S. PATENT DOCUMENTS 6,824,312 B2 11/2004 McClellan et al.
2003/0103335 A1 6/2003 Skradde et al.

OTHER PUBLICATIONS

DS3/T3 Fiber Optic Links, Versitron; DS3/T3 Point-to-Point Fiber Optic Link (2000).

Extend Broadband E3, T3 & STS-1 Service Over fiber-Quickly and Economically; Optical/Electrical Converter Module for the BCS II; Telect, In.; www.telect.com; Oct. 2000.

BCS II Optical-Electrical Converter Module; www.telect.com (admitted prior art as of filing date).

Telect, Inc., Vector Stand-Alone Modules, http://www.telect.com, 3 pgs. (2001).

Telect, Inc., Vector Chassis 32-Position, User Manual, http://www.telect.com, 24 pgs. (2001).

Telect, Inc. "Vector™ optical transport system applications & specifications," 2 pgs., (2001).

* cited by examiner

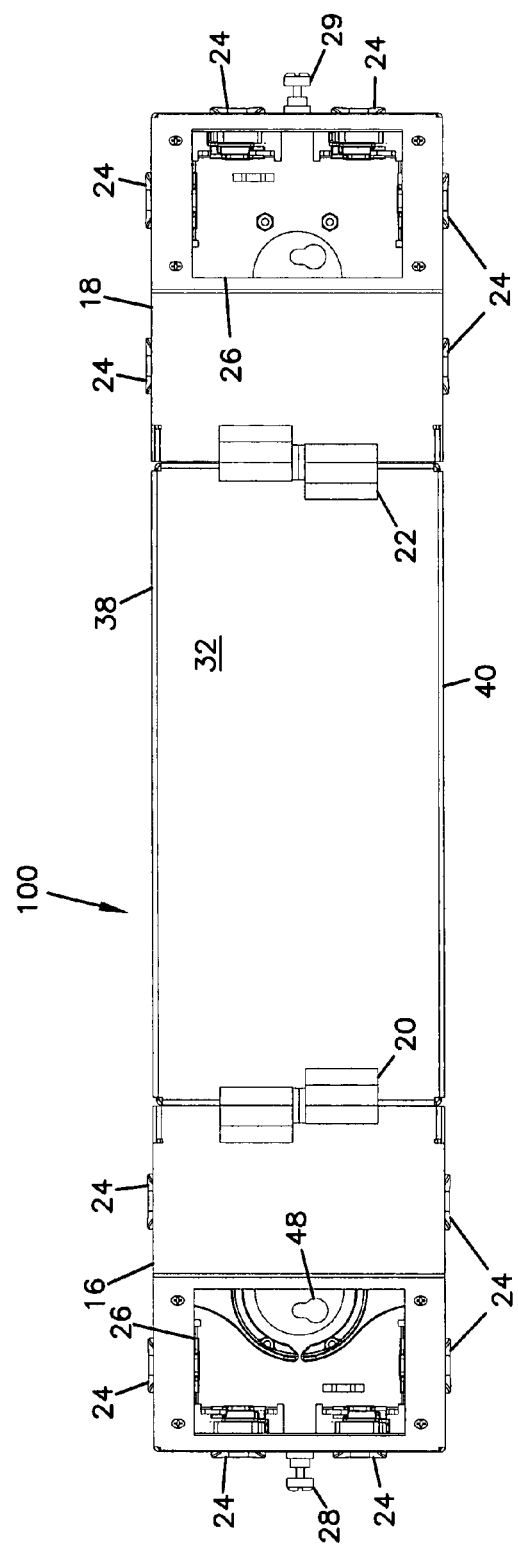
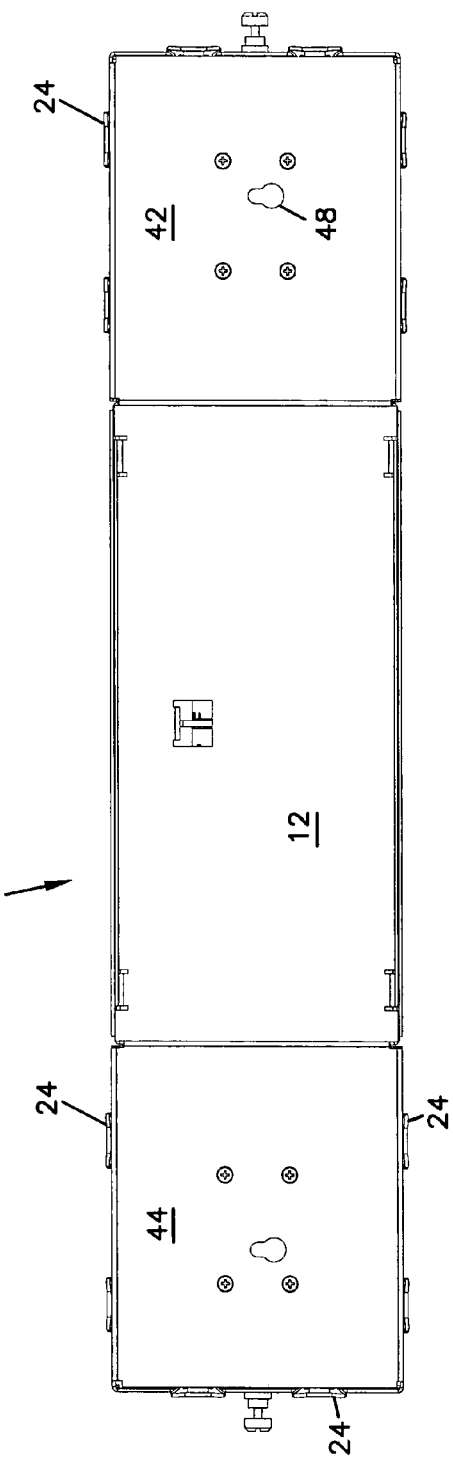
FIG. 2
FIG. 3

WALL MOUNT CHASSIS

CROSS REFERENCE TO RELATED APPLICATION

This application is a divisional of application Ser. No. 11/054,774, filed Feb. 8, 2005 now U.S. Pat. No. 7,233,732, which is a continuation of application Ser. No. 10/268,064, filed Oct. 8, 2002, now U.S. Pat. No. 6,912,349, which applications are incorporated herein by reference.

TECHNICAL FIELD

The present application is directed to telecommunications chassis and associated modules. More specifically, the present invention is directed to chassis and module structures that facilitate conversion between electrical and optical signals.

BACKGROUND

Chassis for housing telecommunications modules provide a structure for protecting the modules from externalities while providing heat dissipation for circuitry contained on the modules. The modules are also shielded from electromagnetic interference. Furthermore, the chassis provides control of flame spread should a fire ever be imposed within the chassis.

Cable management to and from the chassis is often a concern. The electrical signal cables and the optical signal cables lead to the converter modules. A power cable supplies power for converting the signals, and for powering other system components. Organizing the cables, and protecting the cables from damage is a significant concern.

Thus, there is a need for chassis and module structures that facilitate protection of telecommunications cables and circuits, including those performing electrical to optical and optical to electrical conversions.

SUMMARY

A wall mount chassis is provided including a main housing defining an interior for receipt of telecommunications circuitry. The main housing defines a rear wall, an opposed front wall, and first and second sides extending between the front and rear walls. The rear wall is mountable to a vertical wall. The first side defines a cable access location. The second side also defines a cable access location.

Preferably, first and second hinged covers are provided, each cover hinged at a hinge adjacent to one of the first and second sides, respectively. Each hinged cover includes an access window for viewing an interior of the cover. Preferably, the access window is positioned on an angled surface of the cover, angled with respect to the side and the front wall.

In a preferred embodiment, a plurality of cable clips are positioned adjacent to each of the first and second sides for retaining cables positioned adjacent to the first and second sides.

Preferably, a back plane including circuit traces is provided, the back plane extending parallel to the first and second sides. The first and second sides each define an opening for receipt of at least one circuit card extending perpendicularly to the back plane, each circuit card defining at least one of the cable access locations.

The main housing also preferably includes extensions extending generally parallel to the rear wall from adjacent to the first and second sides, the extensions defining cable openings to receive cables extending toward the cable access locations.

A method of managing telecommunications cables is provided comprising the steps of providing a chassis mounted to a wall and having left and right sides, extending an electrical signal cable to a selected side selected from the left and right sides, and extending an optical signal cable to the selected side. The extended electrical signal cable and the extended optical signal cable are connected to a signal converter circuitry within the chassis. The method further includes extending a power supply cable to the other side opposite the selected side, and connecting the extended power supply cable to the signal converter circuitry within the chassis.

The method preferably includes providing hinged covers, one cover at each of the left and right sides, and further comprising the step of hinging the covers closed to cover each of the left and right sides of the chassis.

The method preferably includes providing cable clips, and further comprising the step of clipping each cable to one of the cable clips before hinging the covers to the closed positions.

BRIEF DESCRIPTION OF THE DRAWINGS

FIG. 2 is a front view of an alternative wall mount chassis to the chassis of FIG. 1, with a different cover retention mechanism, and no front visual indicators.

FIG. 3 is a rear view of the chassis of FIG. 2.

DETAILED DESCRIPTION

Figure 1:
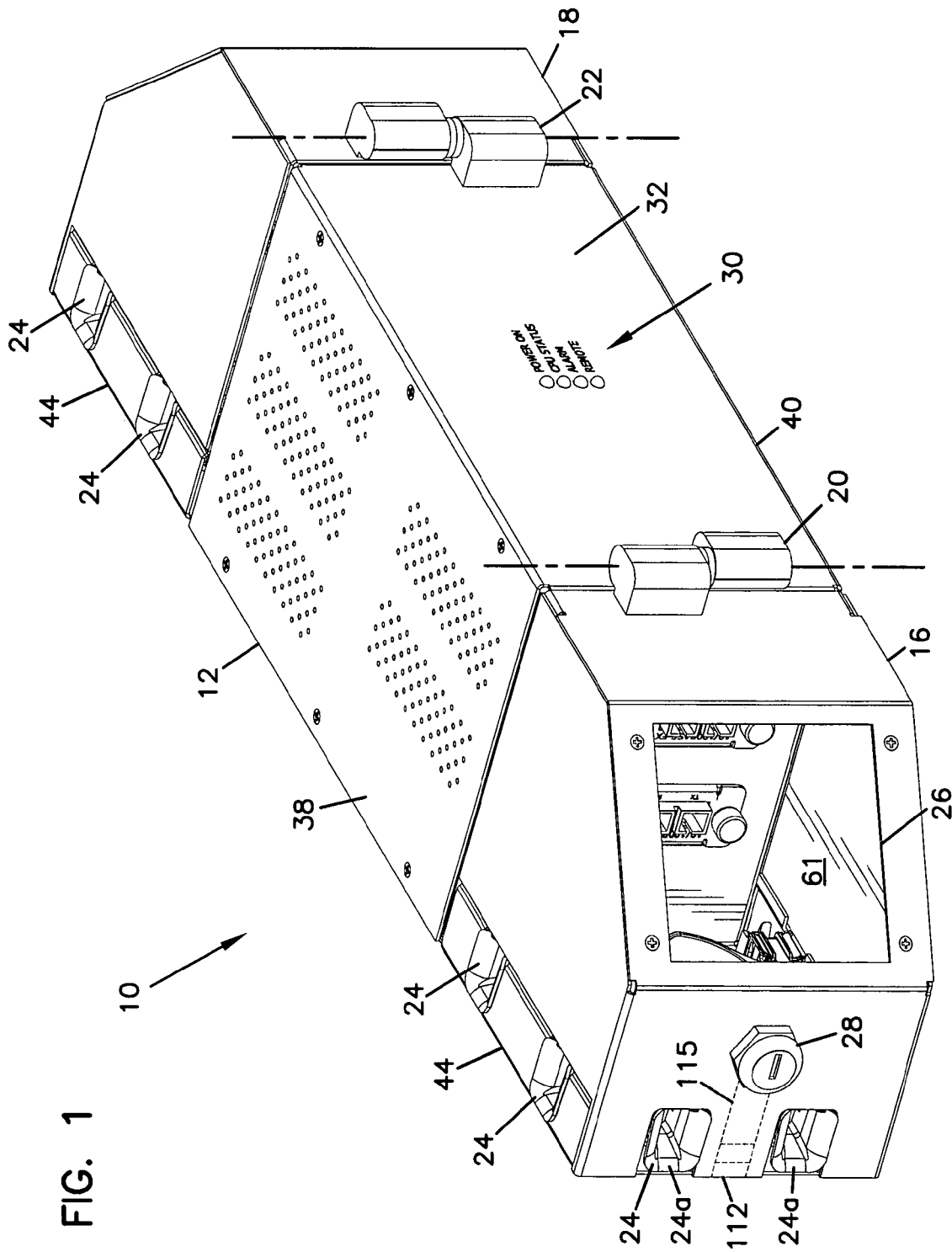
FIG. 1 is a top, front, left side perspective view of a first embodiment of a wall mount chassis.
Figure 4:
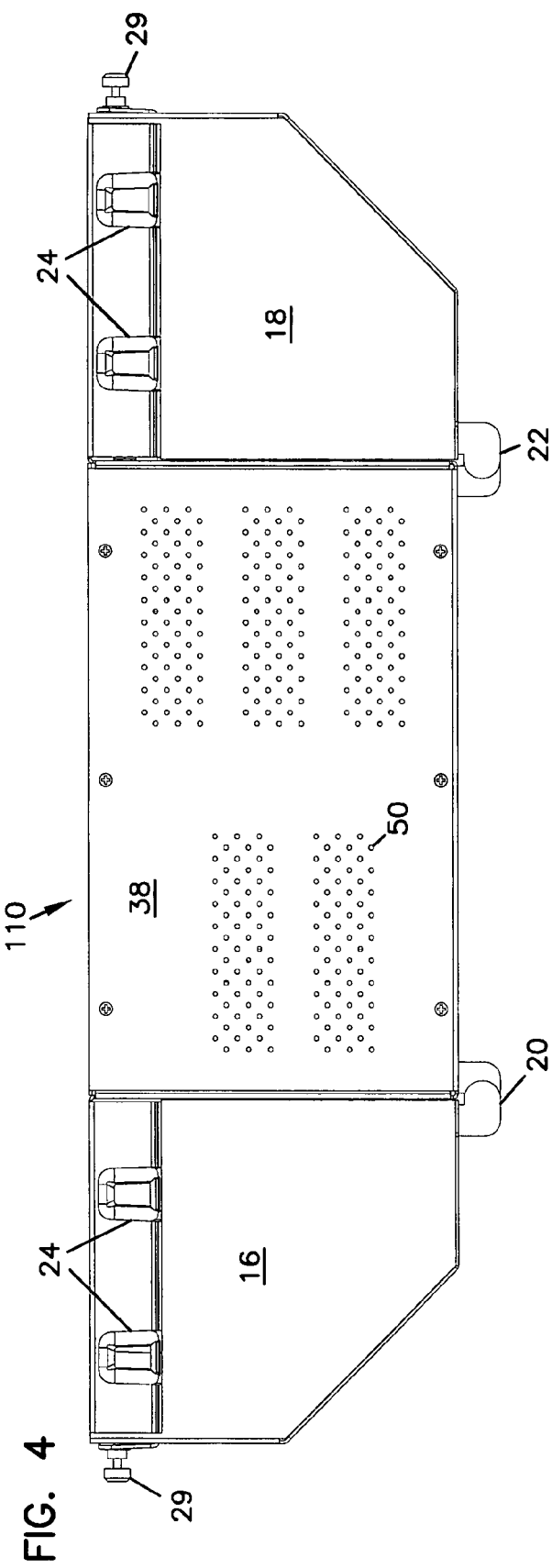
FIG. 4 is a top view of the chassis of FIG. 2.
Figure 5:
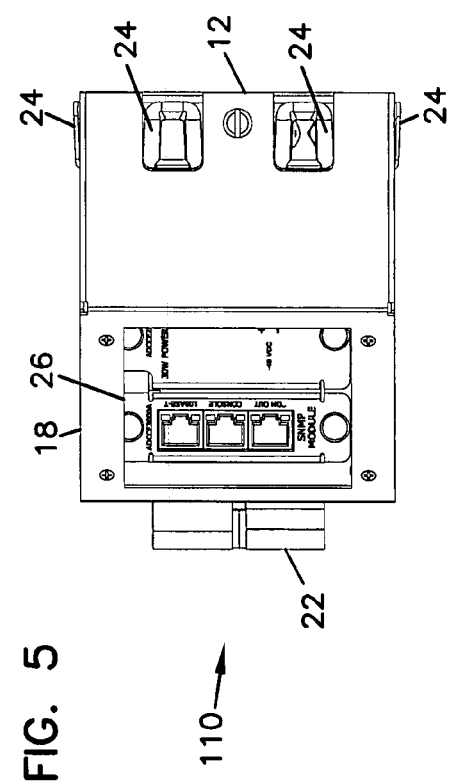
FIG. 5 is a right side view of the chassis of FIG. 2.
Figure 6:
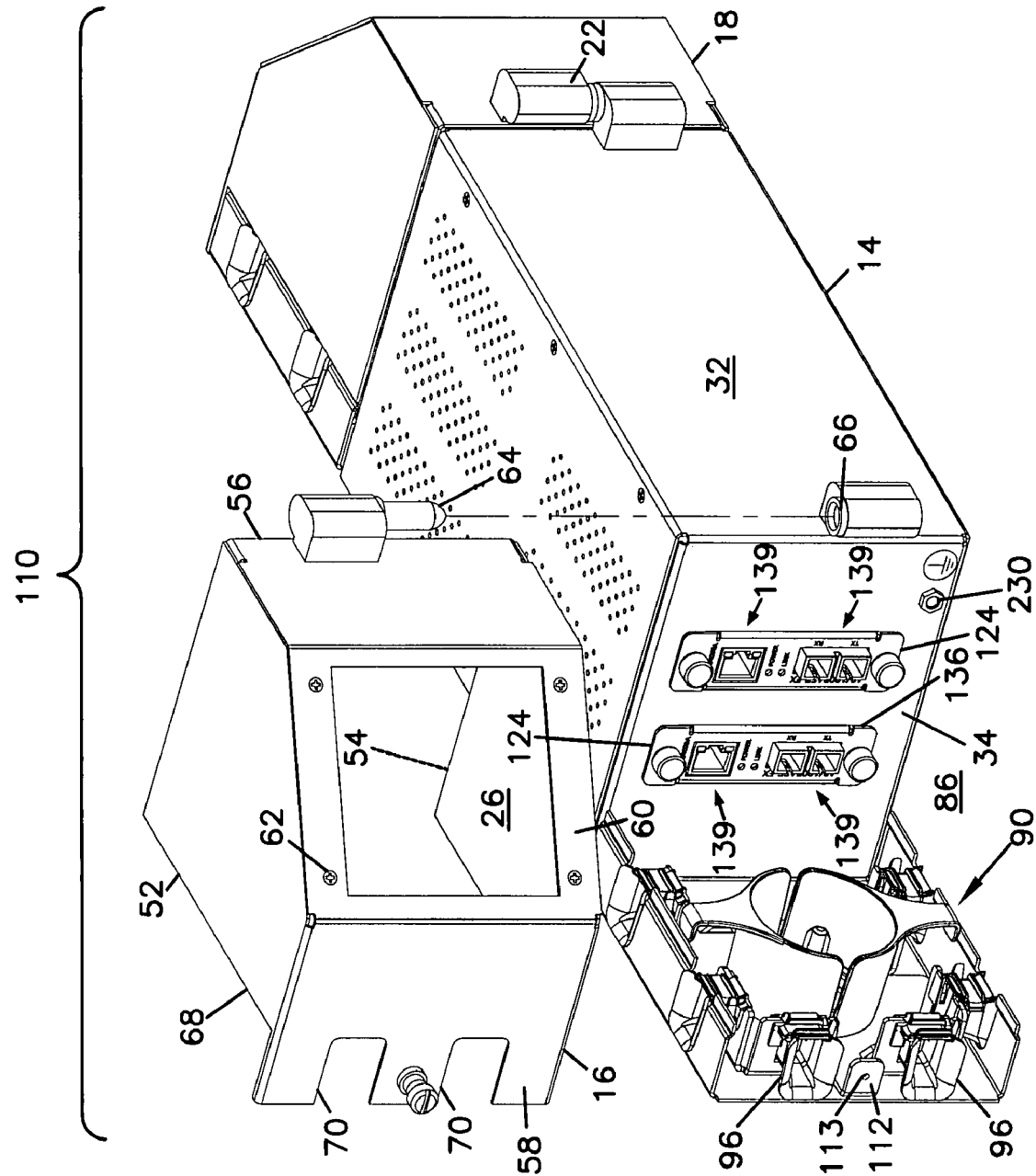
FIG. 6 is a top, front, left side perspective view of the chassis of FIG. 2, show with the left side cover lifted off of the main housing.
Figure 7:
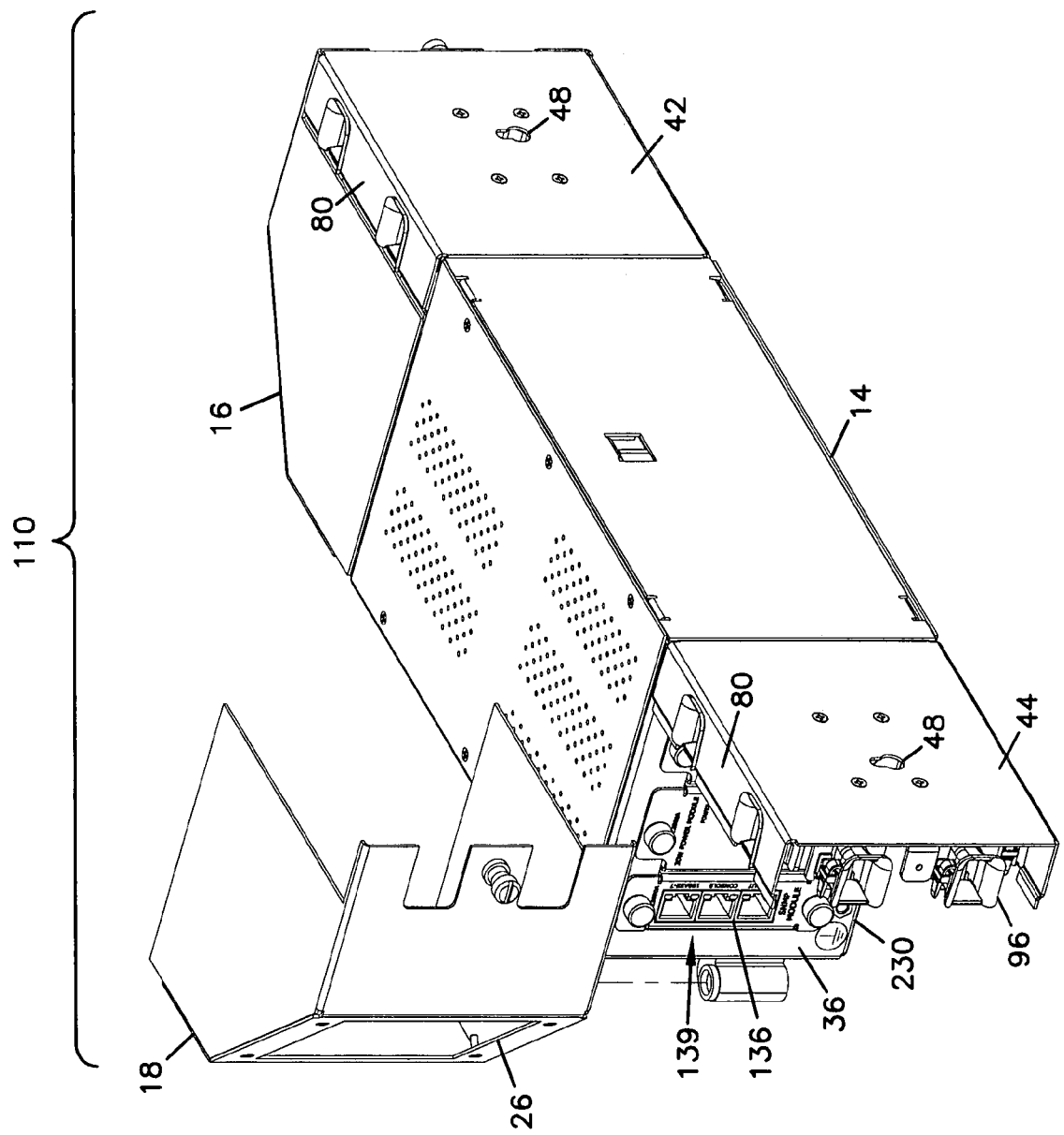
FIG. 7 is a top, rear, right side perspective view of the chassis of FIG. 2, with the right side cover lifted off of the main housing.
Figure 8:
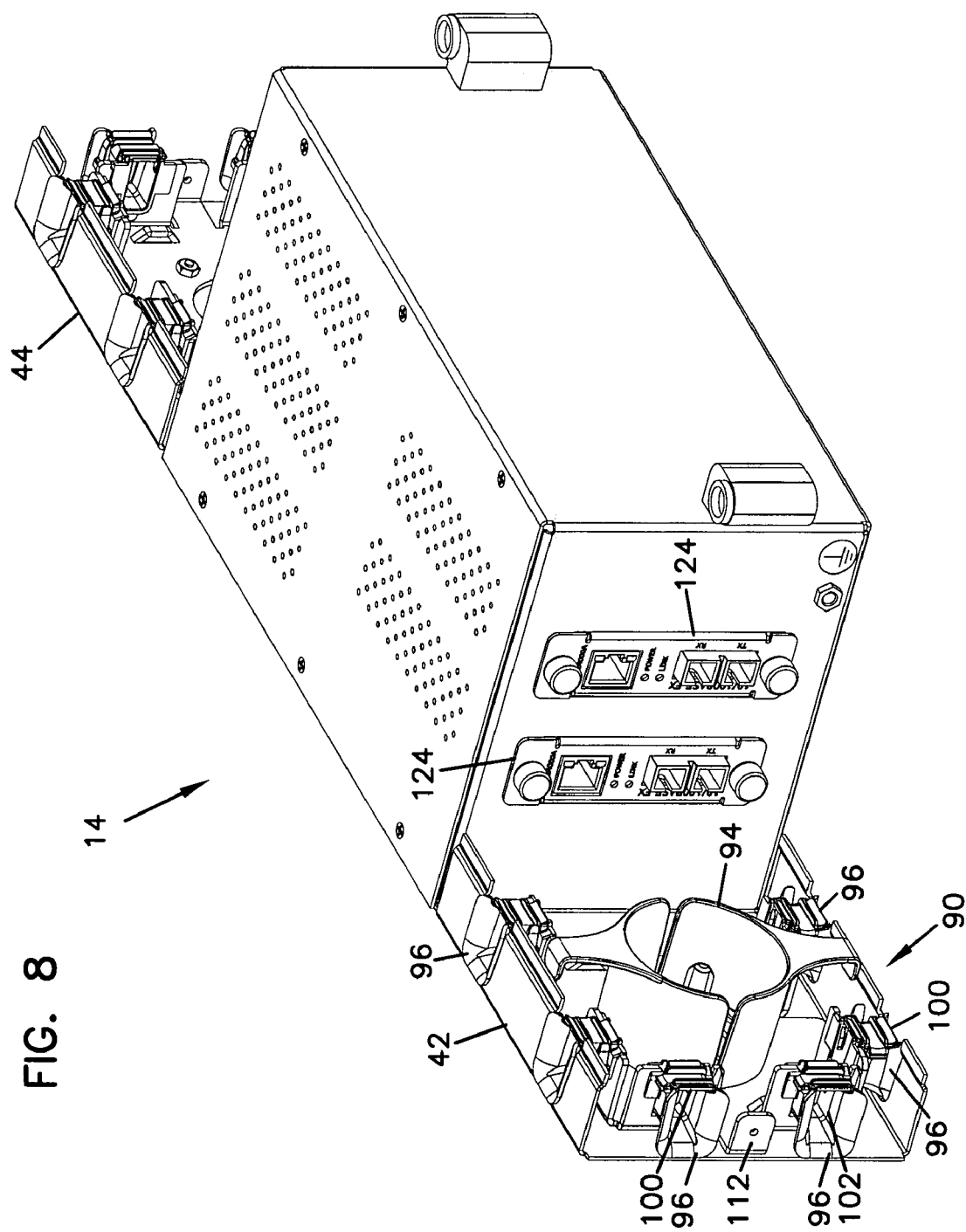
FIG. 8 is a top, front, left side perspective view of the chassis of FIG. 2 without the left and right side covers.
Figure 9:
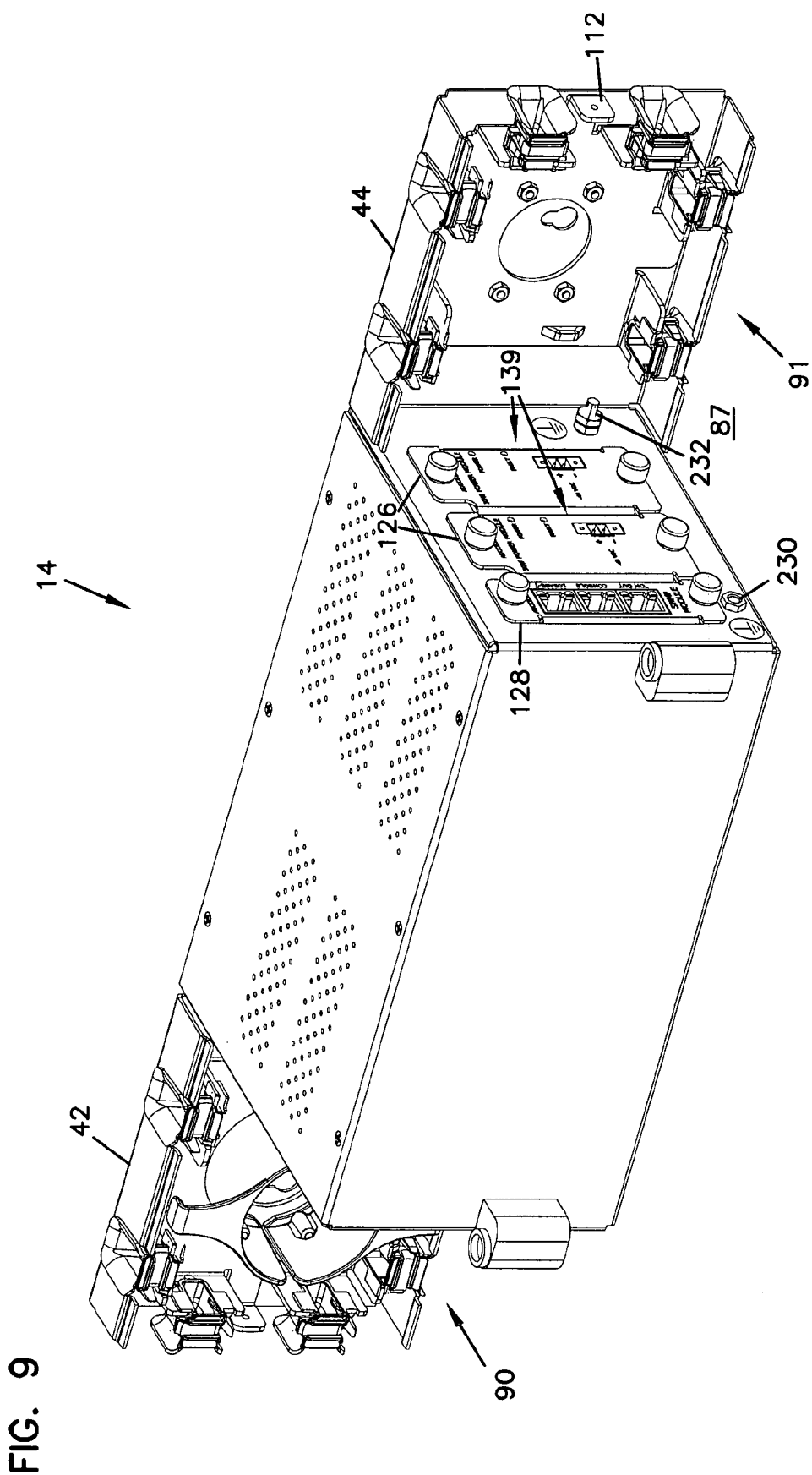
FIG. 9 is a top, front, right side view of the chassis of FIG. 8.
Figure 10:
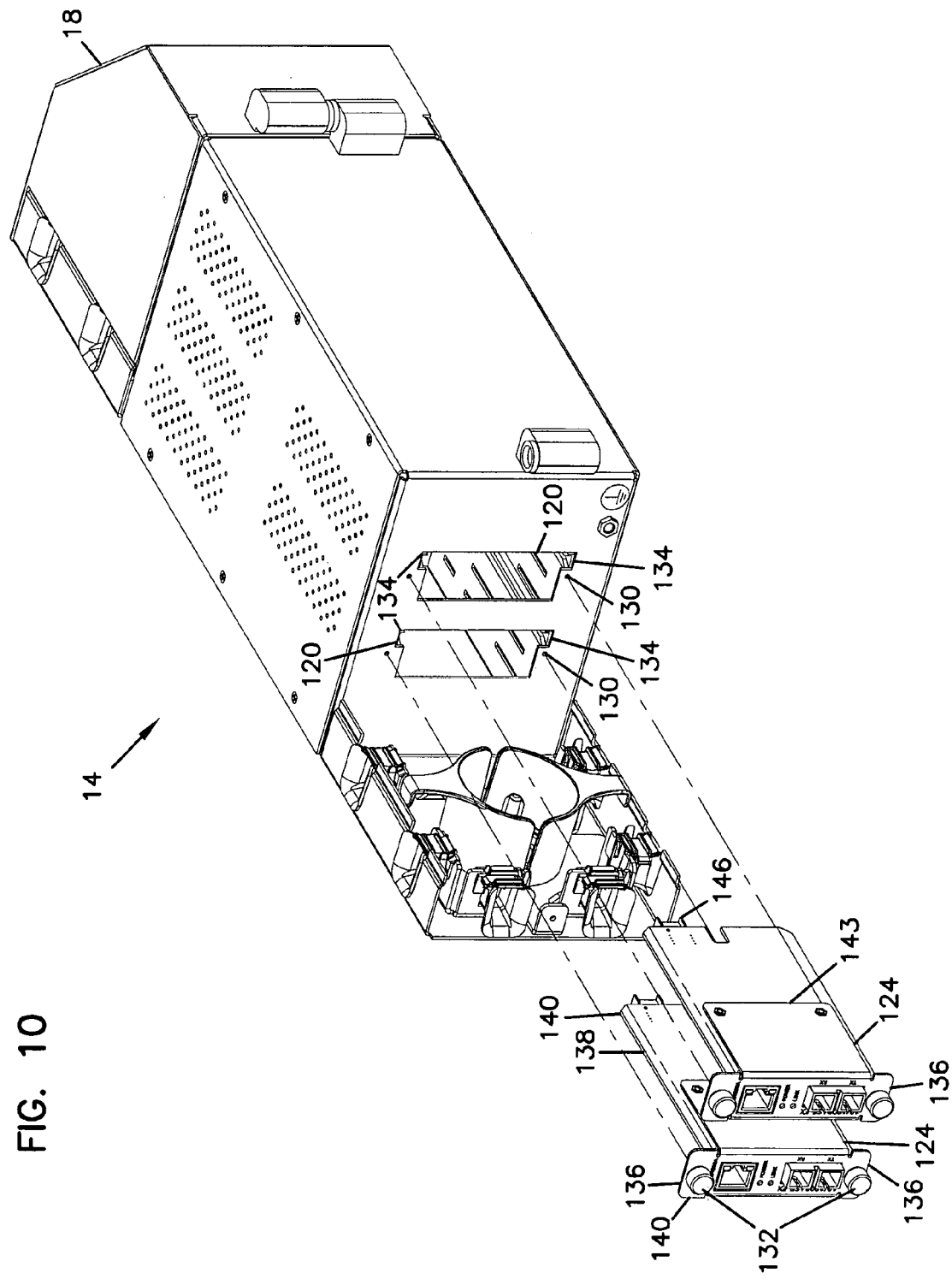
FIG. 10 is a left side perspective view of the chassis of FIG. 2, showing two signal converter cards removed from the chassis.
Figure 11:
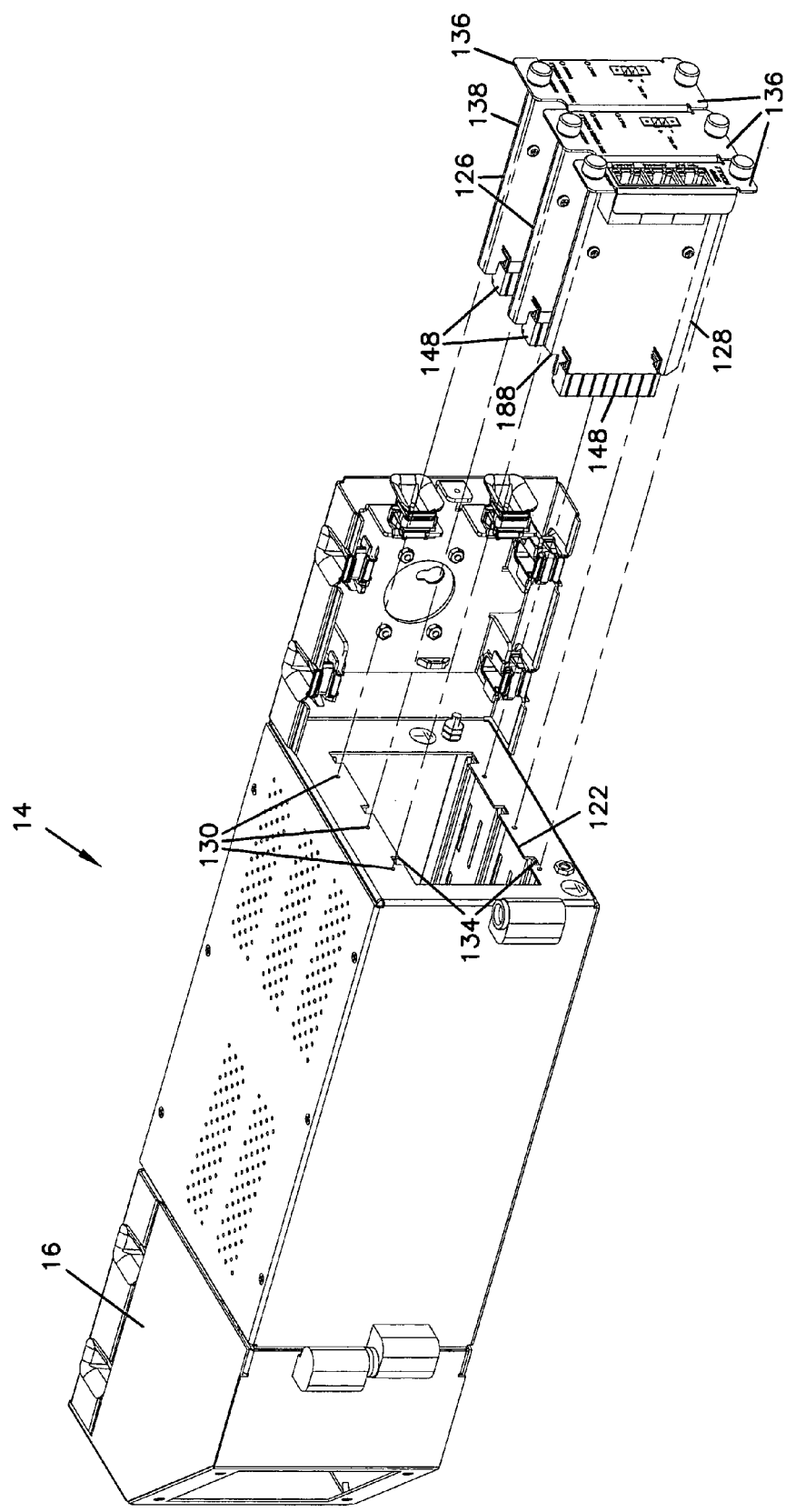
FIG. 11 is a left side perspective view of the chassis of FIG. 2 showing two power cards and one CPU card removed from the chassis.

Referring now to FIG. 1, a first preferred embodiment of a wall mount chassis 10 is shown. Along a rear wall 12, chassis 10 is mounted to a wall of a building. Chassis 10 includes conversion capability for converting electrical signals to optical signals, and optical signals to electrical signals. Specifically, chassis 10 receives cabling containing the optical signals, and cabling containing the electrical signals. Circuitry within chassis 10 converts between electrical and optical signals. Chassis 10 also includes a power supply cable for powering the circuitry necessary to convert between electrical and optical signals. Preferably, chassis 10 also includes CPU cabling for communicating with other system equipment.

Chassis 10 includes a main housing 14 and first and second hinged covers 16, 18. Cover 16 defines a left side cover or left cover 16, and second cover 18 defines a right side cover or right cover 18. Covers 16, 18 pivot about hinges 20, 22, respectively. Hinges 20, 22 define vertical axes of rotation. Cables enter chassis 10 through one or more openings 24 on each end of chassis 10. Viewing windows 26 are provided for viewing internal structures behind covers 16, 18 when the covers are in the closed positions shown in FIG. 1. Only one window 26 is visible in FIG. 1. Covers 16, 18 can be retained in the positions shown in FIG. 1 through the use of a retention member 28. Preferably, retention member 28 is a keyed lock, or another device for holding the covers in the closed positions. Main housing 14, and covers 16, 18 of chassis 10 are made from convenient materials, such as sheet metal.

Windows 26 can be used to view cabling and connection conditions behind covers 16, 18. Windows 26 can also be used to view visual indictors associated with chassis 10, such as power, and alarm status. A further visual indicator 30 can be provided along a front 32 of chassis 10. The windows 26, and the front visual indicator 30 lessen the need to open covers 16, 18 to check status.

Referring now to FIGS. 2-30, a similar wall mount chassis 110 is provided. One difference over chassis 10 includes chassis 110 not having any front visual indicators along a front 32. Chassis 110 also utilizes a fastener retainer 29 instead of keyed lock 28 for holding the covers 16, 18 in the closed position. For the purposes of the further description below, chassis 10, 110 will be referred to as chassis 10.

Main housing 14 includes front 32, sides 34, 36, a top 38, and a bottom 40. First and second extensions 42, 44 are provided, one each end of main housing 14. Extensions 42, 44 provide support for cable management devices for chassis 10. Extensions 42, 44 each include fastener holes 46 useful for attaching cable management structure, as will be described below.

Extensions 42, 44 each include a keyhole 48 for receipt of a mounting fastener for mounting chassis 10 to a wall. Preferably, the spacing between keyholes 48 is set at any convenient distance, such as 16 inches, to correspond with standard building convention where wood wall studs are spaced every 16 inches. Both top 38 and bottom 40 are provided with ventilation holes 50 for dissipating heat contained within main housing 14, such as through convection.

Each cover 16, 18 includes a top 52, a bottom 54, a front 56, and a side 58. Between front 56 and side 58 is an angled side 60 containing window 26. Typically, window 26 is covered by a sheet 61 of clear planar material, such as Plexiglas or polycarbonate. Fasteners 62 can be used to mount the sheet 61 of material in window 26.

Each cover 16, 18 includes a hinge pin 64 for receipt in a hinge socket 66 mounted adjacent to front 32 of main housing. By utilizing a pin and socket type hinge, covers 16, 18 can be lifted off, such as during installation of chassis 10, or when cabling management is conducted where the covers might otherwise interfere with access to chassis 10.

Each of covers 16, 18 include top and side cutouts 68, 70 to permit receipt of cables entering chassis 10 when covers 16, 18 are in the closed positions.

Figure 12:
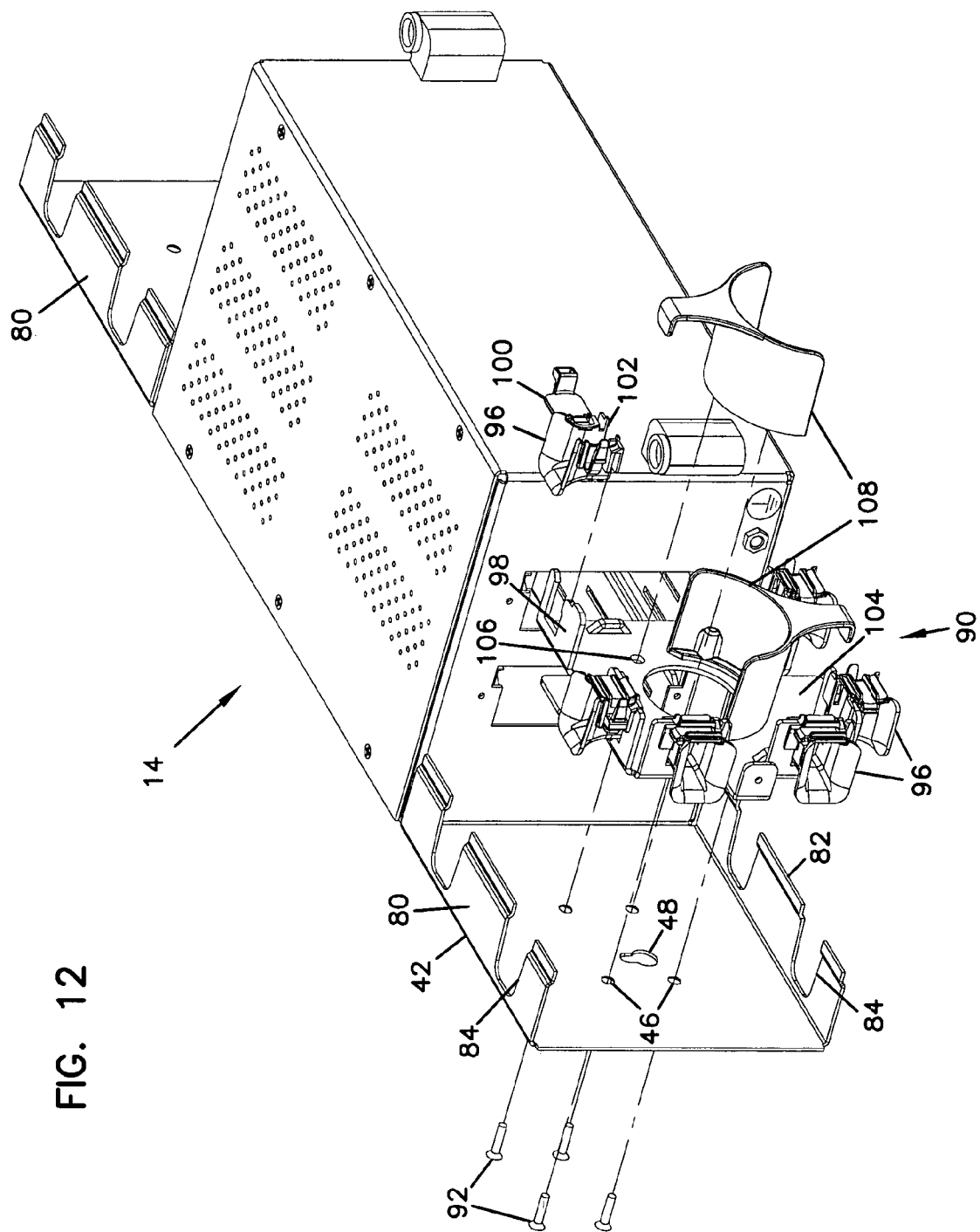
FIG. 12 is a left side perspective view of the chassis showing left side cable management structures exploded from a remainder of the chassis.

Referring now to FIG. 12, further details of the cable management structure for the cables on the left side of chassis 10 are shown. An area 86 behind cover 16 is used to manage the cables carrying the optical and the electrical signals. Top and bottom flanges 80, 82 of main housing 14 extend from extension 42. Cable openings 84 are provided in flanges 80, 82 to allow for cables to enter area 86. A cable management assembly 90 is mounted with fasteners 92 to extension 42. Cable management assembly 90 includes a spool 94 and a plurality of cable clips 96. Flanges 98 of assembly 90 hold each of cable clips 96. Cable clips 96 provide strain relief due to their curved surfaces. Cable clips 96 include a pivotally movable door 100 to access an interior 102 of clip 96 for holding one or more cables in a secure manner. Any cable clip or retention device can be used for clips 96. One example clip is shown and described in U.S. Ser. No. 10/233,018, the disclosure of which is incorporated by reference. Assembly 90 includes a main plate portion 104 which supports flanges 98. Plate portion 104 also includes holes 106 for receiving fasteners for mounting spool portions 108 to plate portion 104 to form spool 94.

Figure 13:
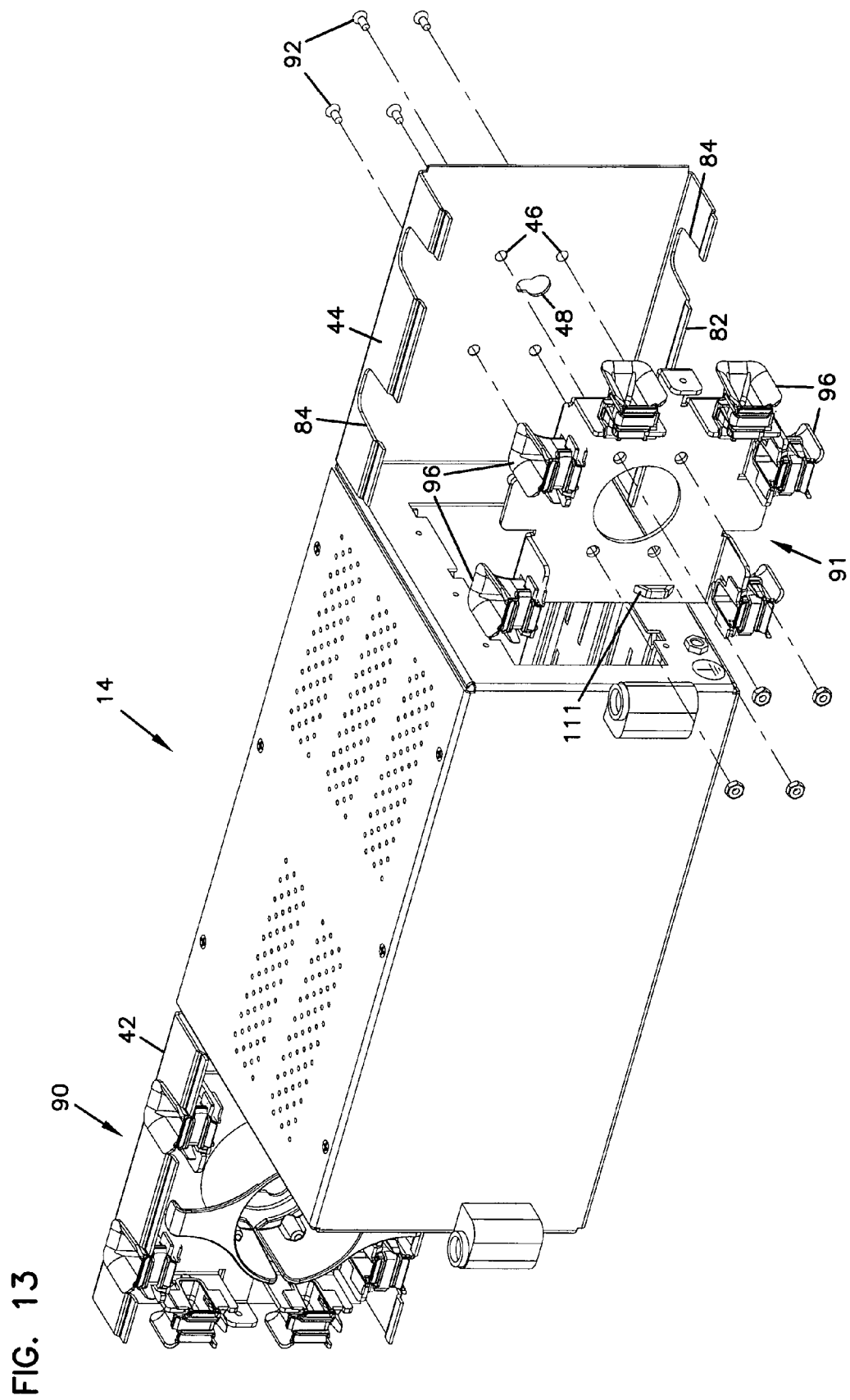
FIG. 13 is a right side perspective view of the chassis of FIG. 2, showing right side cable management structures exploded from a remainder of the chassis.
Figure 14:
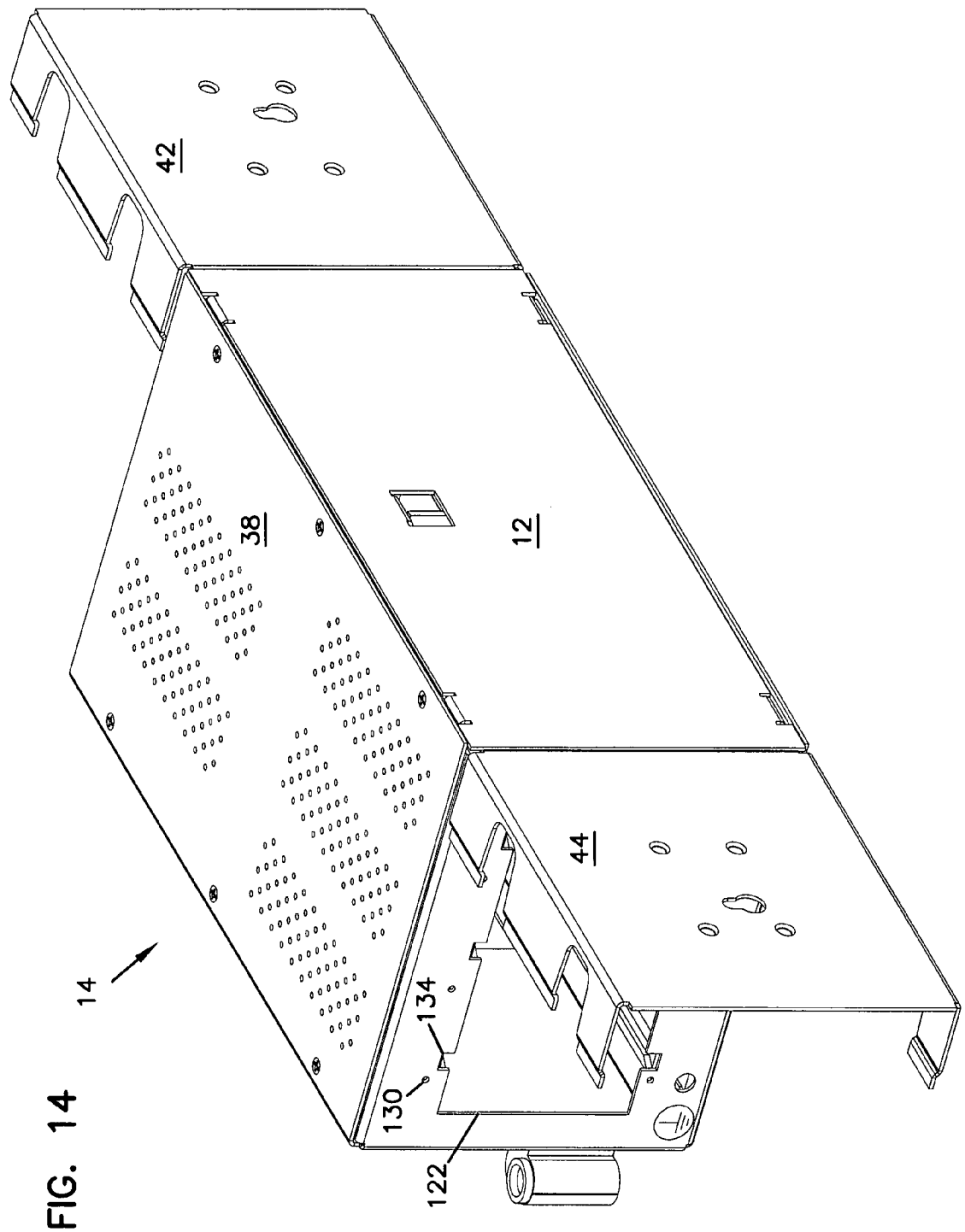
FIG. 14 is a top, rear, right side perspective view of the chassis of FIG. 2, without the covers, and without the cards.
Figure 15:
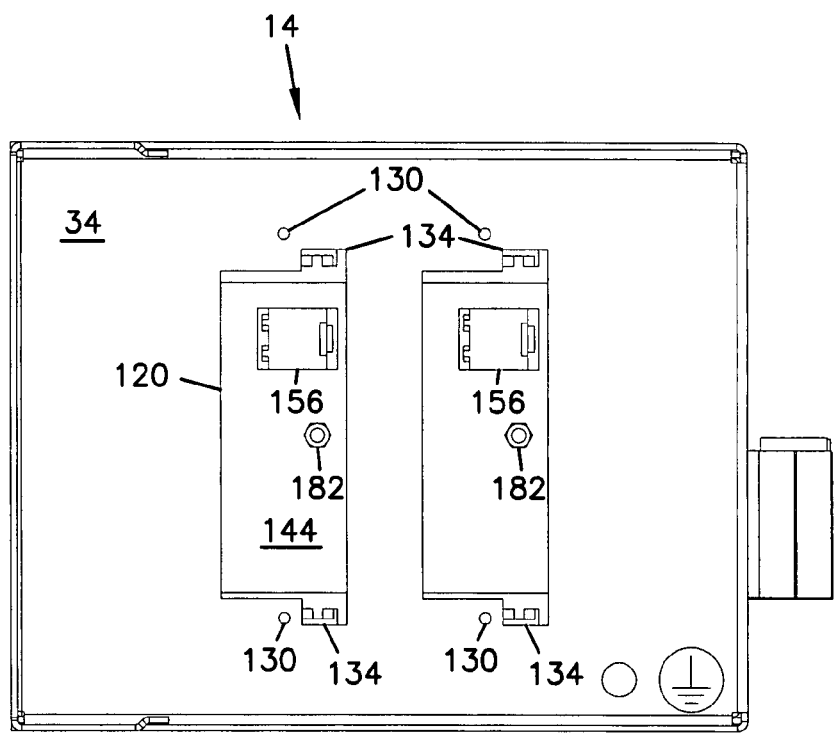
FIG. 15 is a left side view of the chassis of FIG. 14.
Figure 16:
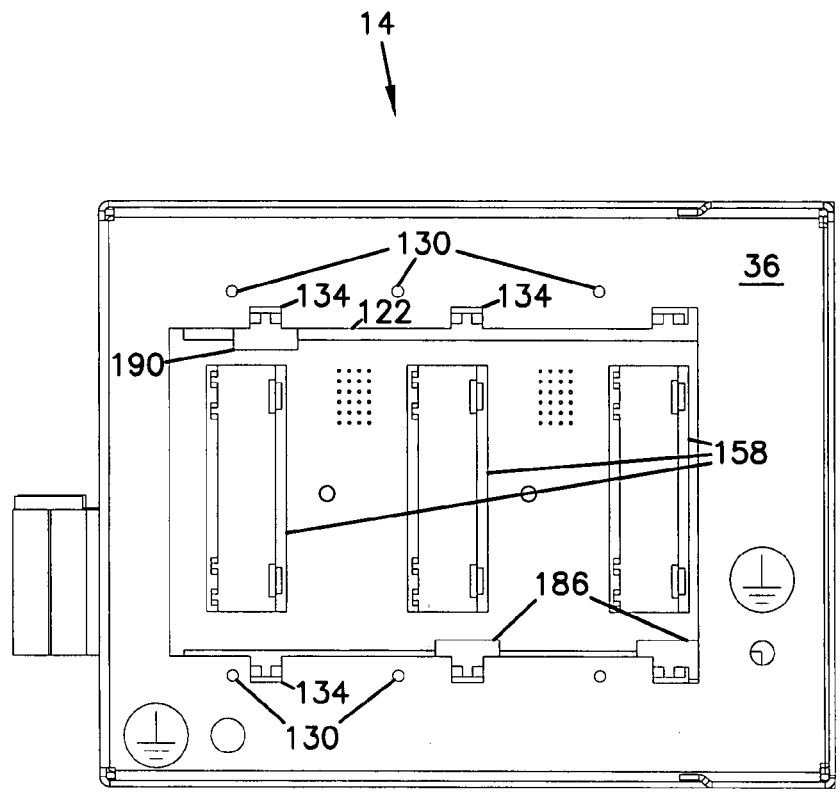
FIG. 16 is a right side view of the chassis of FIG. 14.

Referring now to FIG. 13, a similar cable management assembly 91 is shown with respect to a right side of chassis 10. Assembly 91 is used to manage cables in an area 87 behind cover 18, such as the power cables and the CPU cables. Assembly 91 is similar to assembly 90, however, no spool is provided. Instead, assembly 91 utilizes a lance 111 for tying cables, as necessary. Assemblies 90, 91 can be separately assembled and added to main housing 14.

In the preferred embodiment, many of the parts of cable management assemblies 90, 91 are identical, so as to permit convenient manufacture. One difference is that spool 94 is not provided with respect to assembly 91. Both assemblies 90, 91 include a cover retention tab 112 for cooperating with either keyed lock 28 or fastener retainer 29, through a hole 113, of covers 16, 18.

Chassis 10 is utilized with a plurality of circuit cards received by main housing 14. Preferably, main housing 14 includes card openings 120, 122 at each of sides 34, 36, respectively, for receiving the desired circuit cards. Openings 120, 122 can be shaped as desired to mate with the various cards of the shapes shown, or other shapes. Openings 120 are each shaped to receive one card. Opening 122 is shaped to receive three cards.

In the preferred embodiment, two converter cards 124 are received one in each card opening 120 at side 34. At side 36, two power cards 126, and one CPU card 128 are received in card opening 122. Fastener holes 130 allow for retention of each of cards 124, 126, 128 through fasteners 132. Notches 134 receive the edges of the card as each is inserted into the opening. Such notches 134 encourage ease of use whereby the cards cannot be inserted upside down.

Each of the cards 124, 126, 128 has a similar structure with respect to a front 136, and a rearward extending circuit board 138 extending perpendicularly to front 136. Fasteners 132 are retained on front flanges 140 for engaging fastener holes 130 to secure each card to main housing 14. At a rear 142 of each card is structure for interfacing with an internal back plane 144. Converter cards 124 include rear connectors 146 for interfacing with back plane connectors 156, such as 26 pin connectors. Power cards 126 and CPU card 128 include rear connectors 148 for interfacing with back plane connectors 158, such as 96 pin connectors. Other connectors 156, 158 can be used to link the cards to back plane 144. Back plane 144 provides an electrical link through circuit tracings between the various cards disposed within main housing 14.

Flanges 140 include front connection locations 139 for connecting to the cables, for example, optical cables, electrical cables (twisted pair), and power cables (DC or AC). Flanges 140 may also include one or more indicators, such as LEDs, which are visible through windows 26 when covers 16, 18 are closed. Flanges 140 are metallic structures and include a rear extension 143 for mounting to circuit board 138. Circuit boards 138 include various circuit tracings to connect the front connection locations 139 to the rear connectors 146, 148 and back plane 144.

Main housing 14 includes a main chassis assembly 141 and an inner chassis assembly 160 including back plane 144. Back plane 144 is loaded into inner chassis assembly 160 through an opening 164 in a front wall 162. Back plane 144 includes a rear notch 152 which interfaces with a rear tab 166 of rear wall 168 of inner housing 160, so as to provide a one way fit for back plane 144. Both the top and bottom walls 170, 172 of inner chassis assembly 160 include a plurality of slotted openings 174, such as for ventilation. Further, each of top and bottom walls 170, 172 include a plurality of slotted plastic card guides 176 for slidably receiving the edges of back plane 144, and cards 124, 126, 128. Each of guides 176 includes a slot 178 extending in a longitudinal direction relative to guide 176. Preferably, guides 176 snap mount to one of top and bottom walls 170, 172. Card guides 176a are aligned with notches 134 to receive each of cards 124, 126, 128. Back plane guide 176b allows back plane 144 to float slightly until the various cards are mated through side opening 120, 122.

Figure 17:
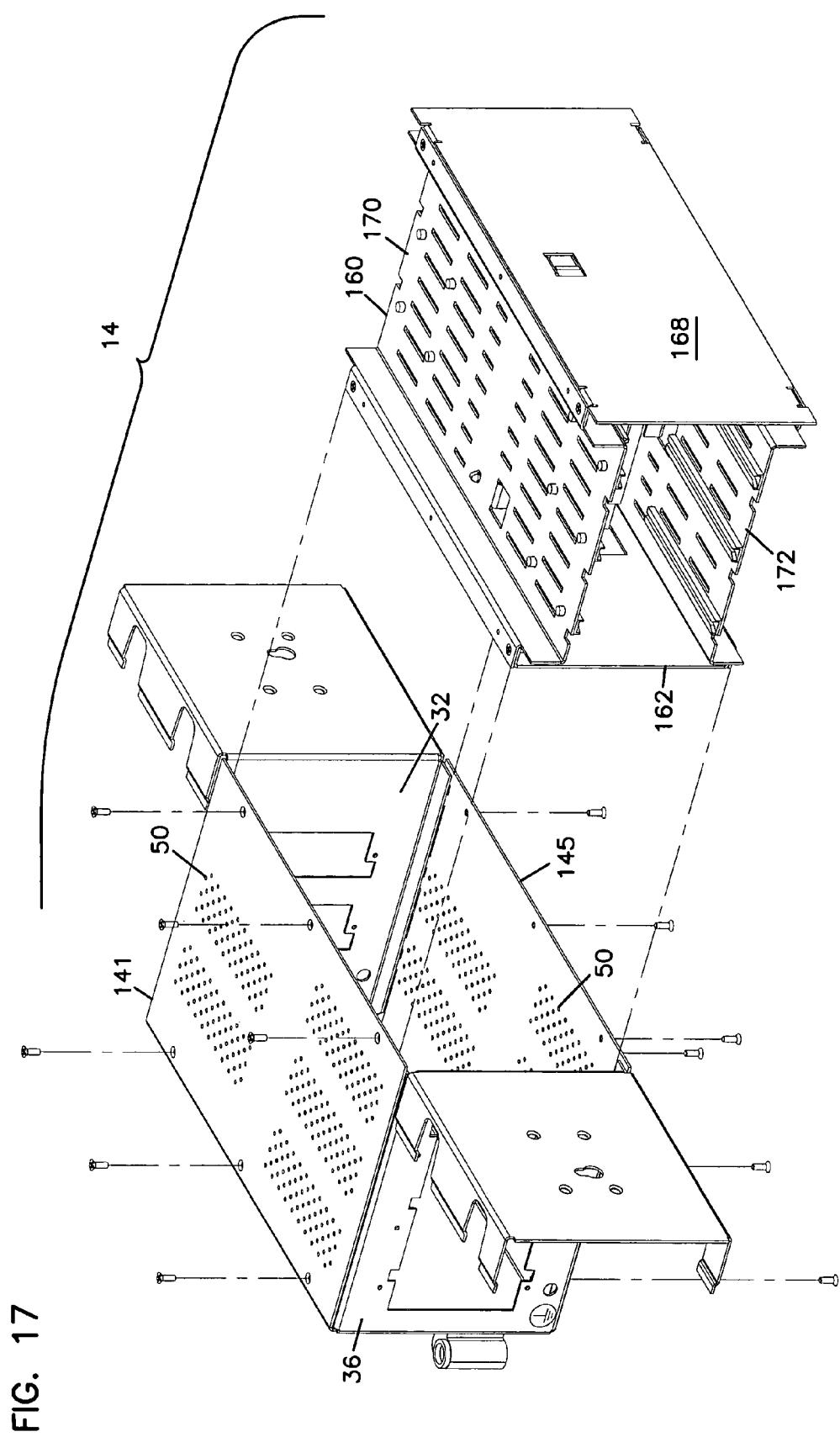
FIG. 17 shows the chassis of FIG. 14 with an inner chassis assembly removed from a main chassis assembly.
Figure 18:
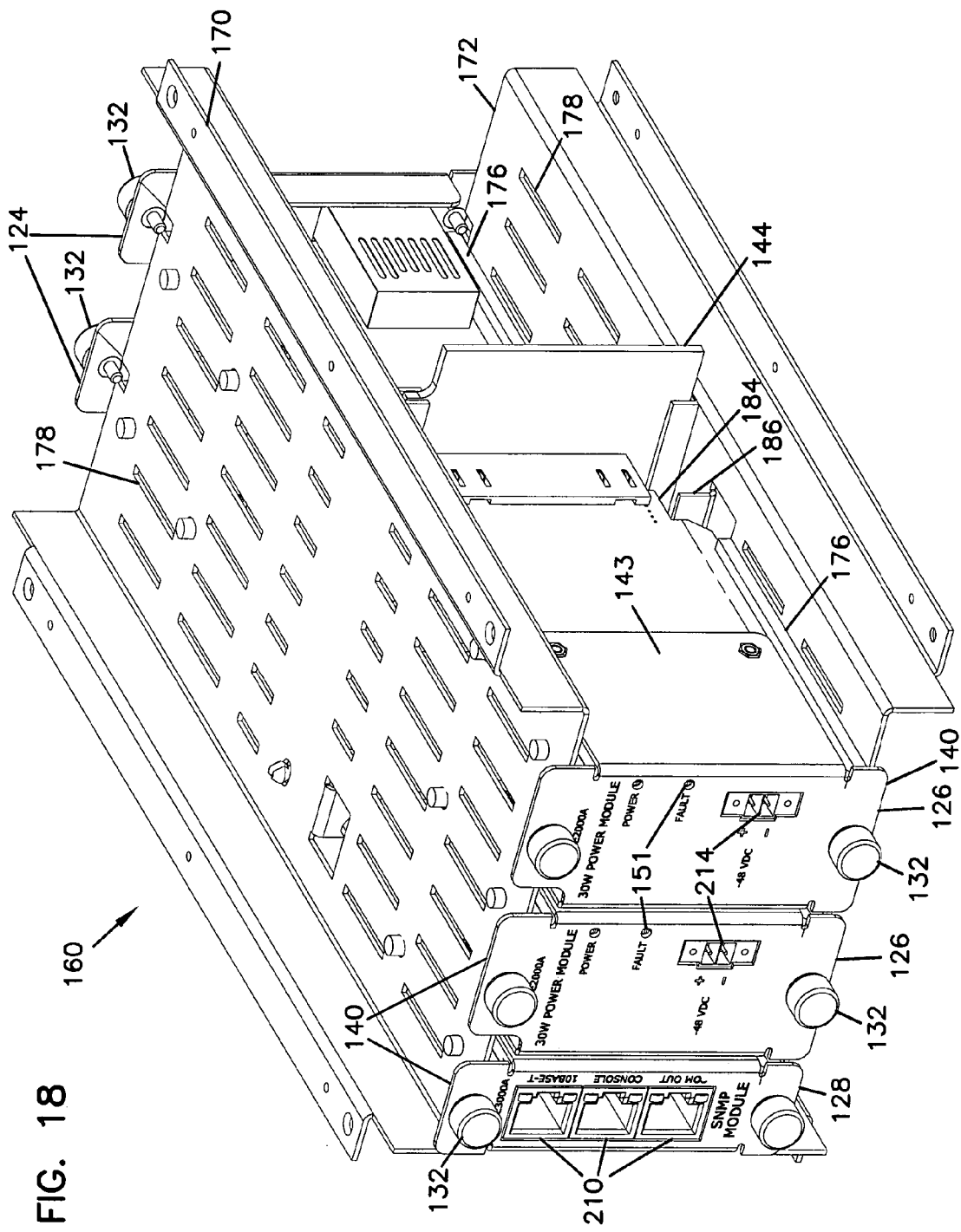
FIG. 18 is a top, rear, right side perspective view of the inner chassis assembly holding the two power cards, the CPU card, and the two converter cards.
Figure 19:
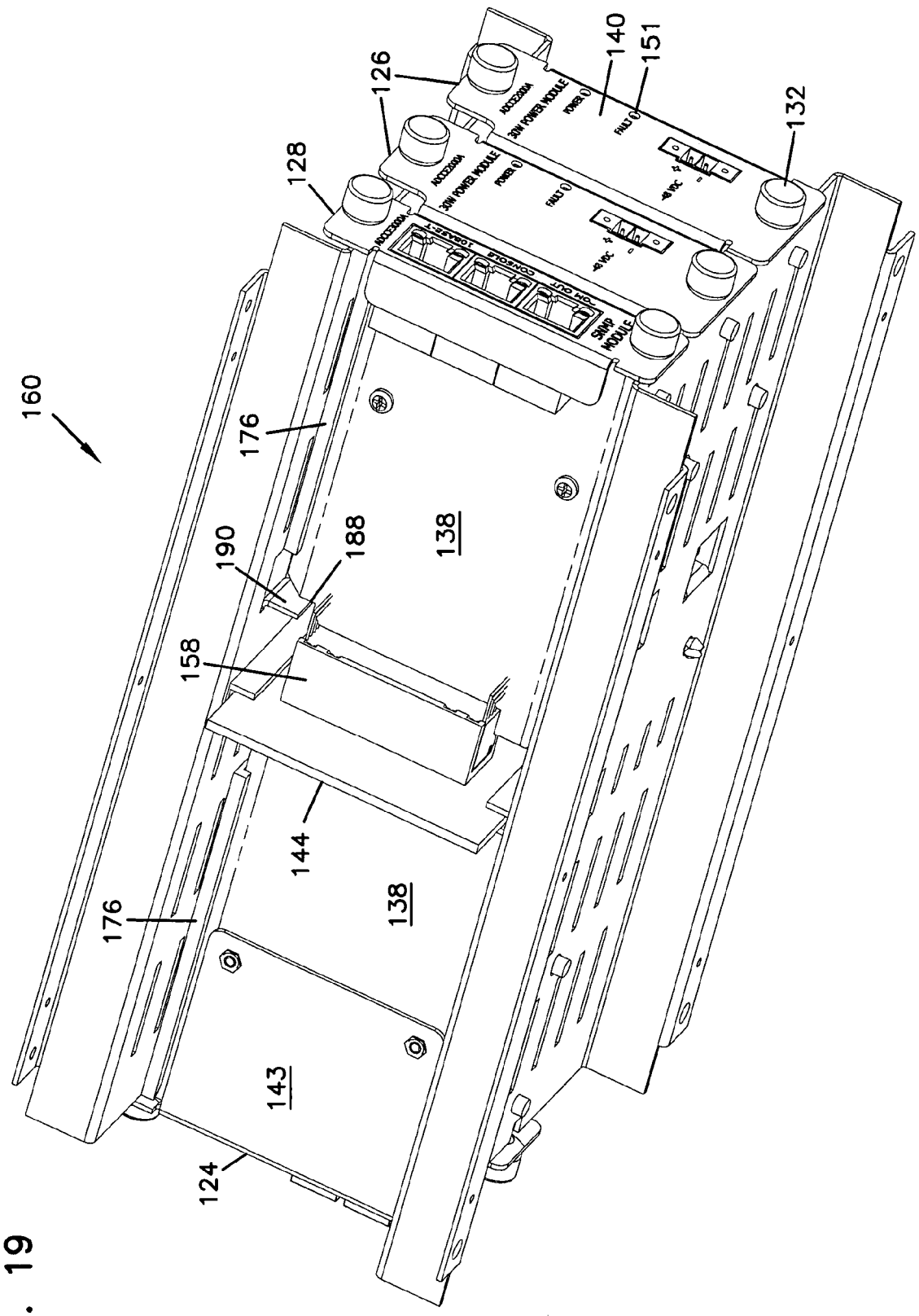
FIG. 19 is a bottom, front, right side perspective view of the inner chassis assembly holding the two power cards, the CPU card, and the two converter cards.
Figure 20:
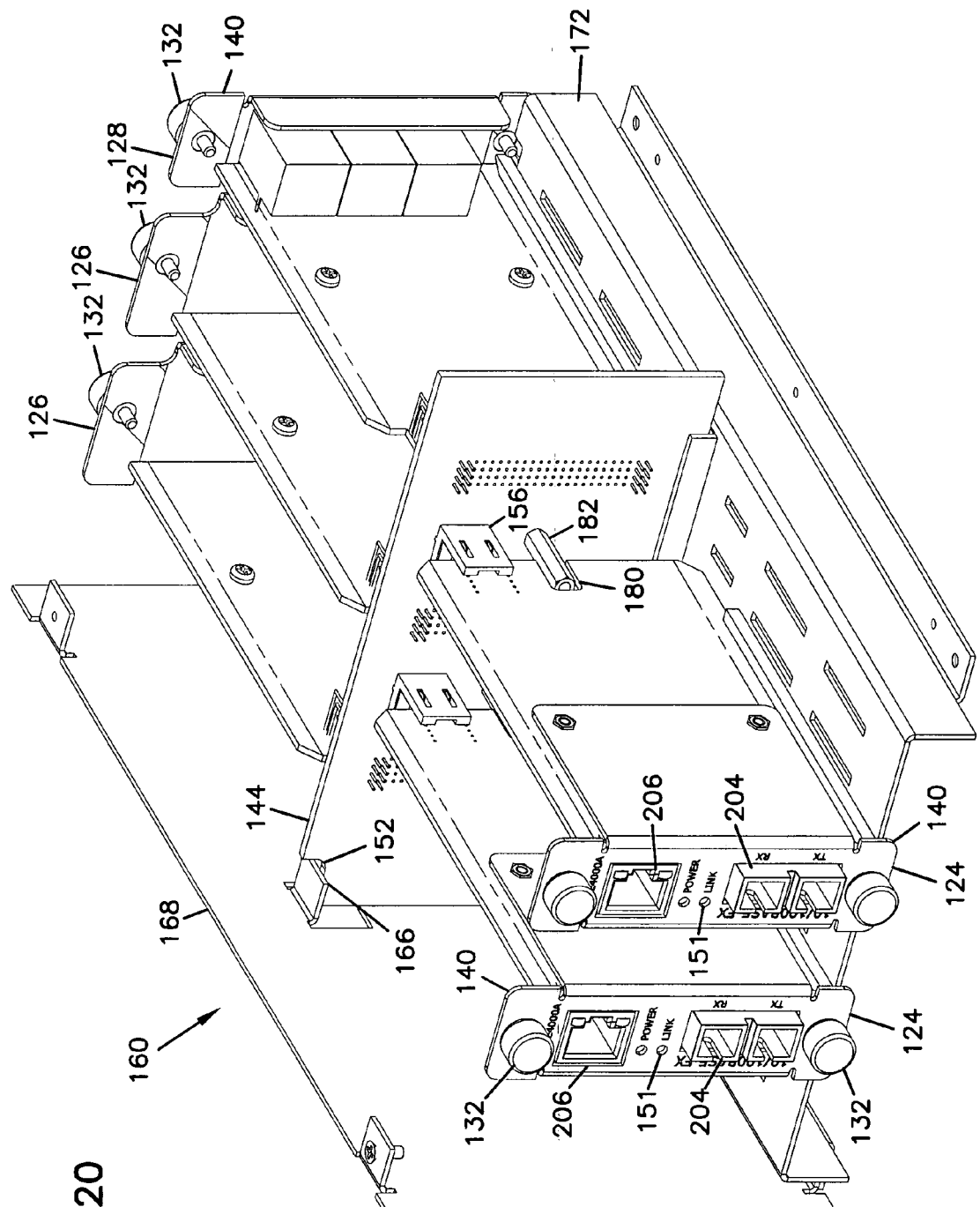
FIG. 20 is a top, front, left side perspective view of the inner chassis holding the two power cards, the CPU card, and the two converter cards, and shown with the top and front removed.
Figure 21:
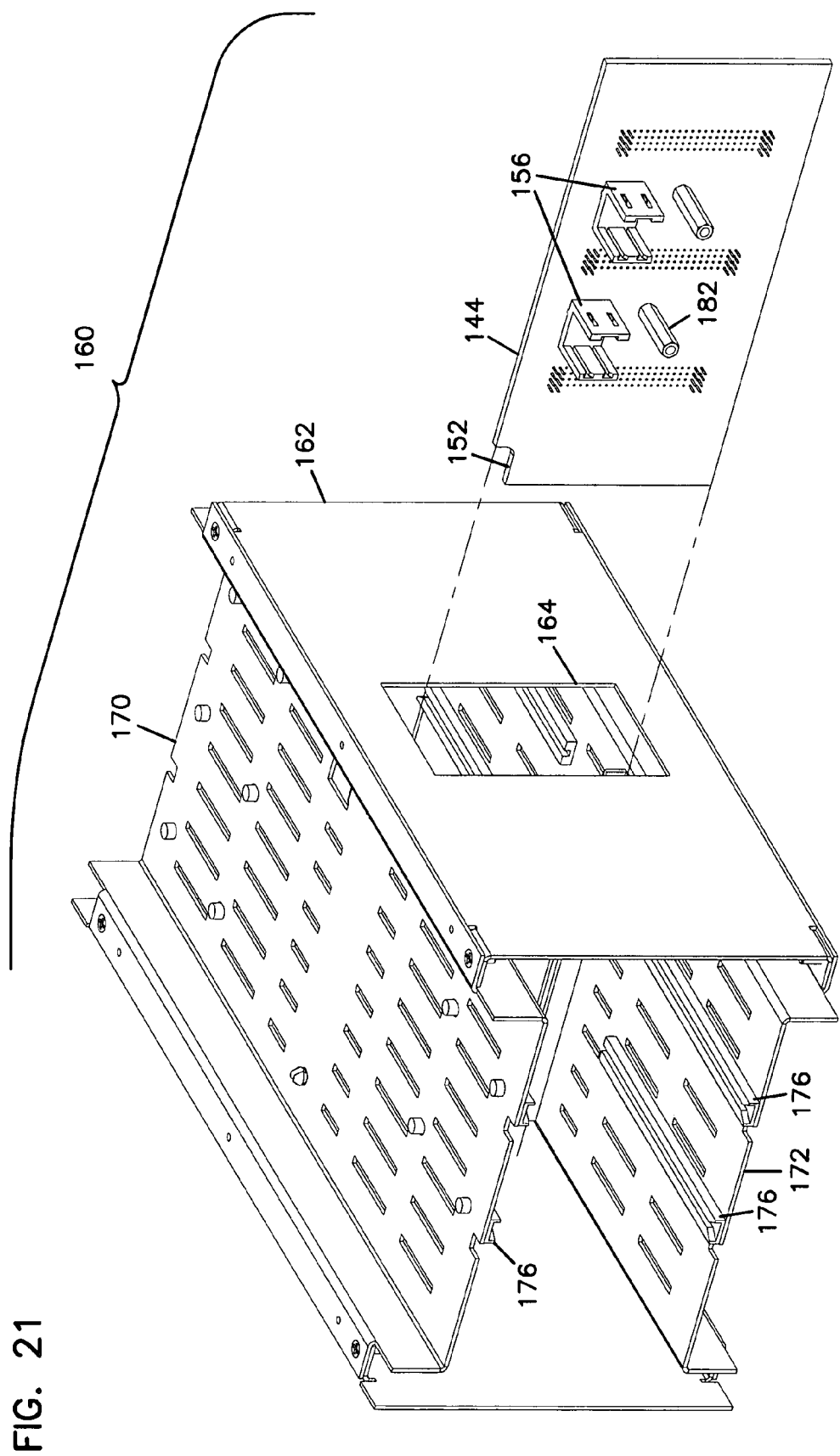
FIG. 21 shows the front, top, left side view of the inner chassis assembly receiving the back plane.
Figure 22:
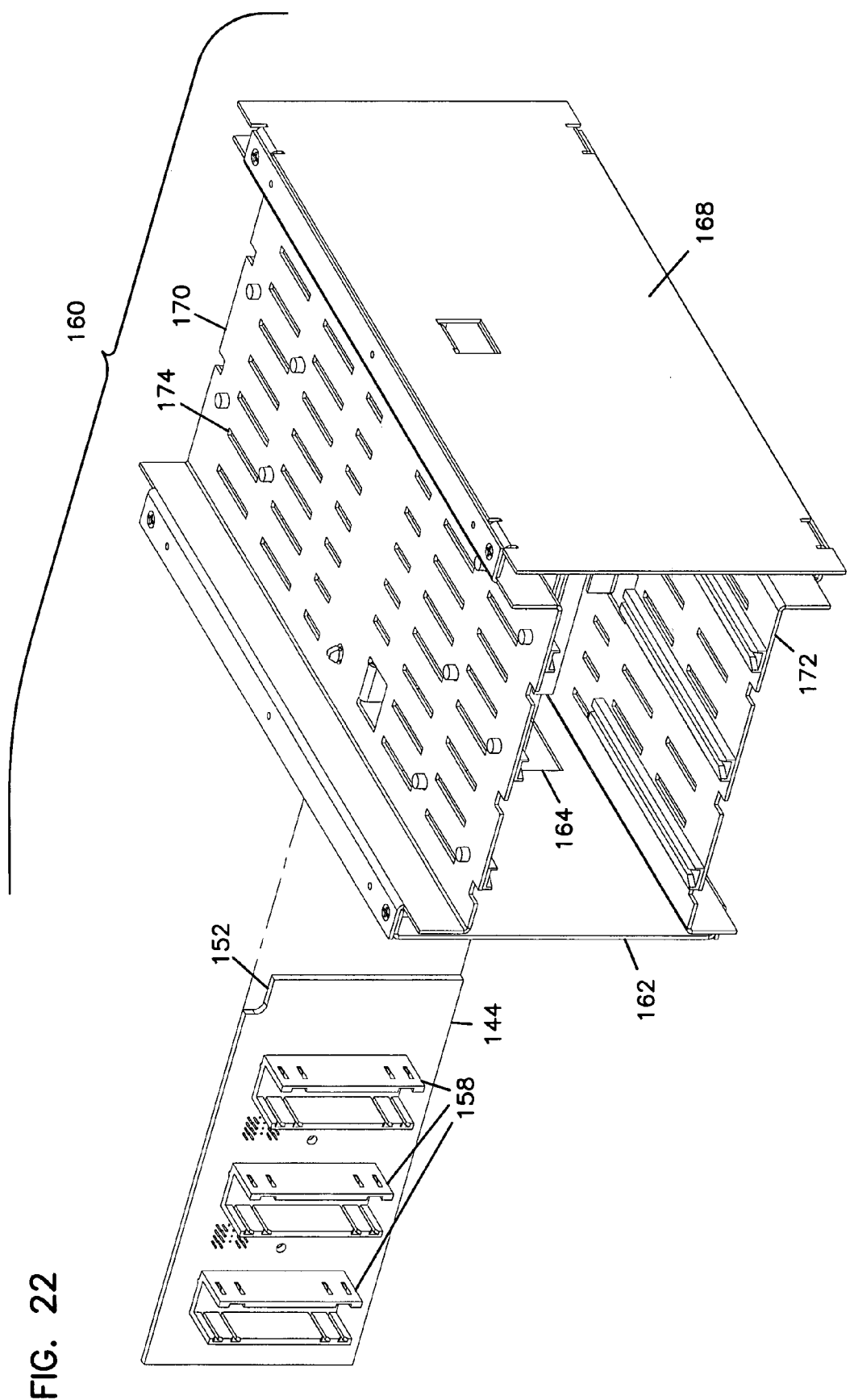
FIG. 22 is a top, back, right side perspective view of the inner chassis receiving the back plane.
Figure 23:
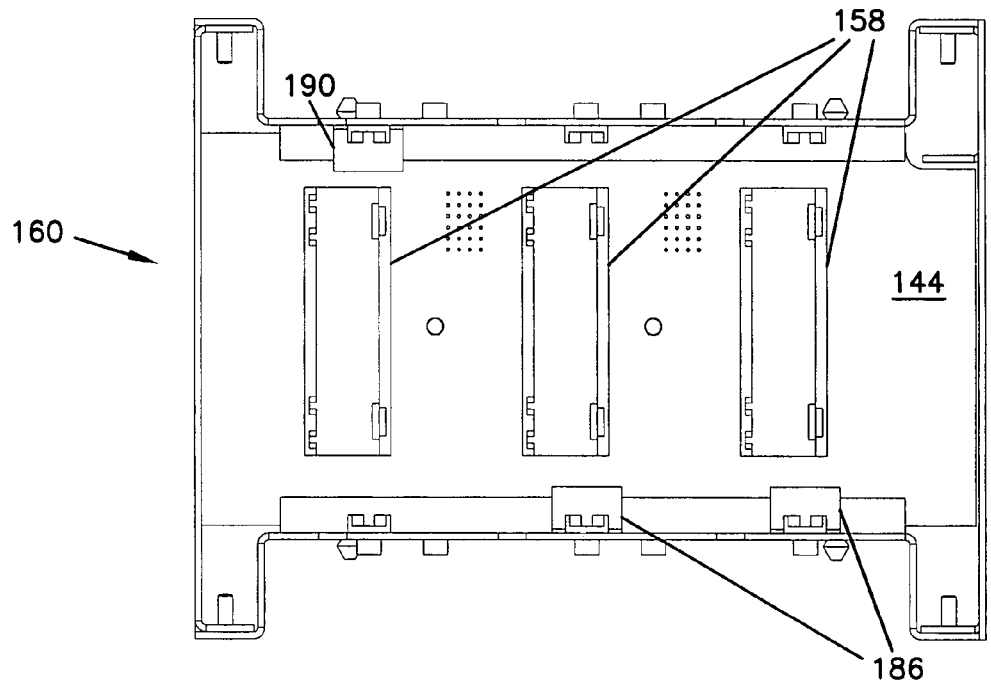
FIG. 23 is a right side view of the inner chassis assembly including the back plane.
Figure 24:
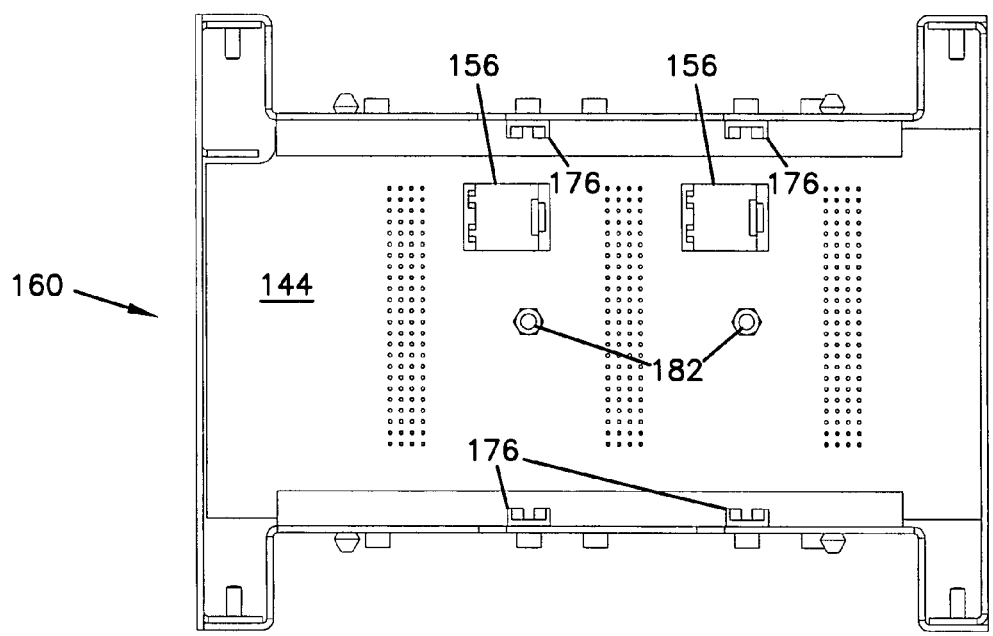
FIG. 24 is a left side view of the inner chassis assembly including the back plane.
Figure 25:
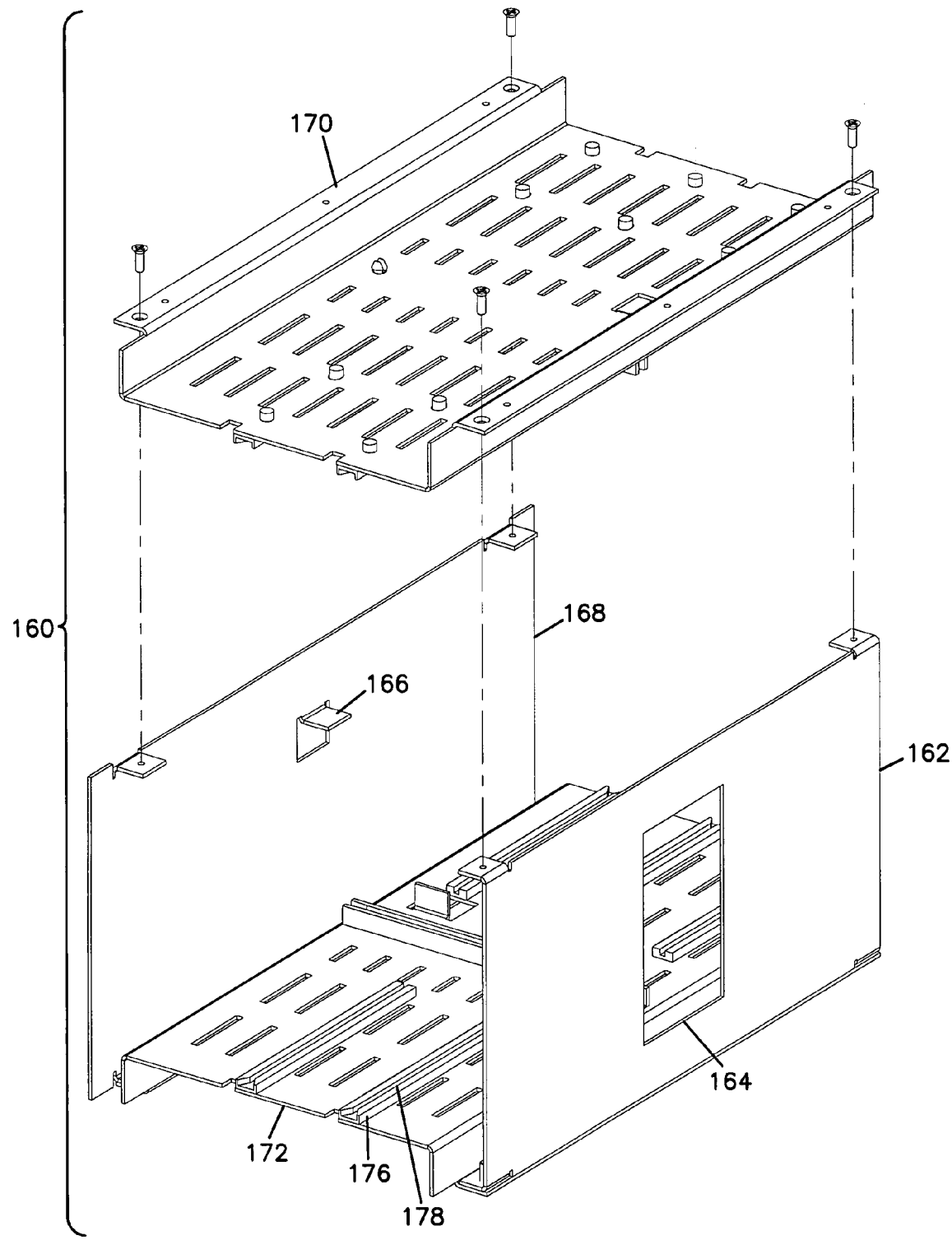
FIG. 25 is an exploded view of the inner chassis assembly, showing the top exploded and the back plane removed.
Figure 26:
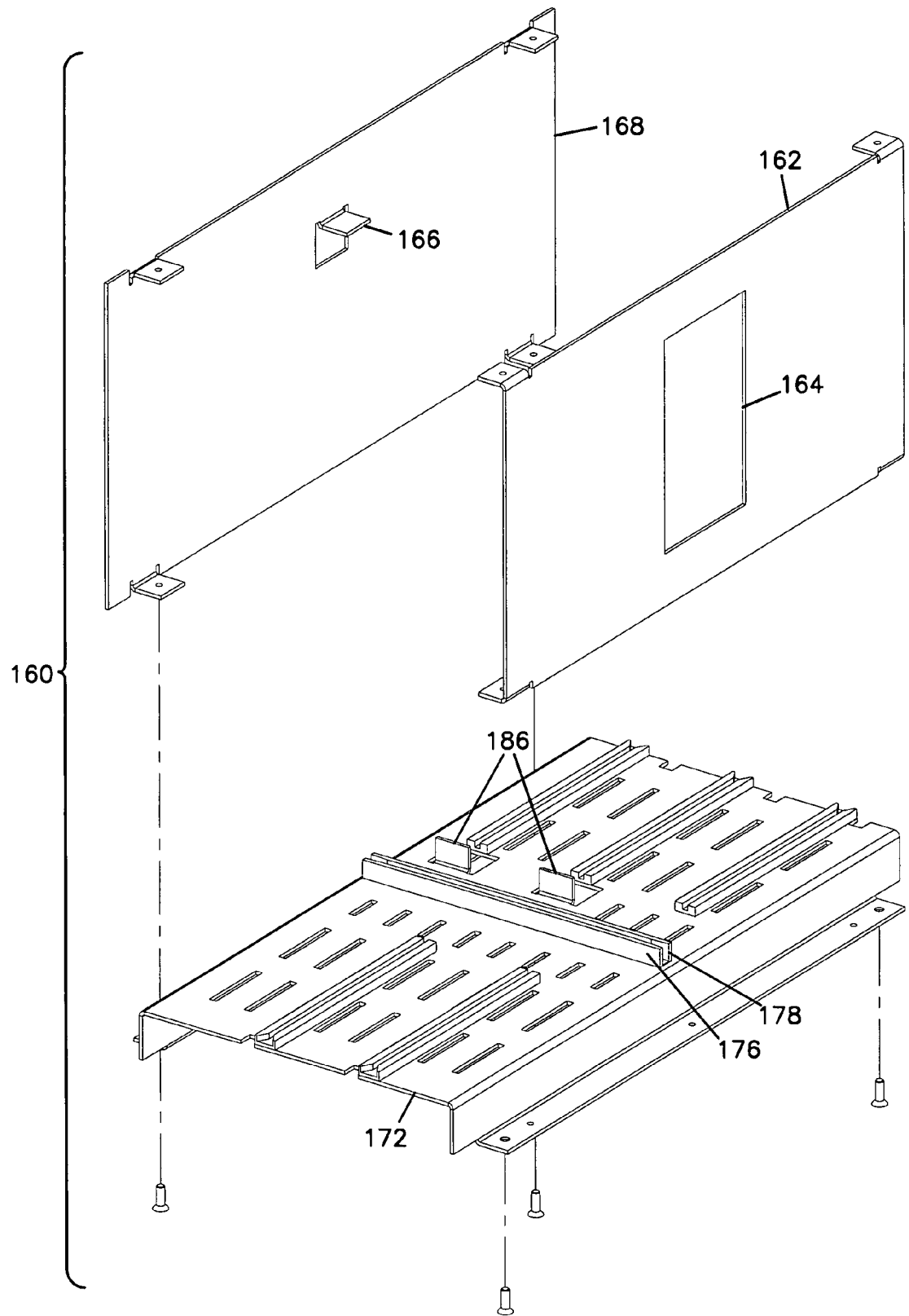
FIG. 26 is a further exploded view of the inner chassis assembly of FIG. 25, showing the front and rear exploded.
Figure 27:
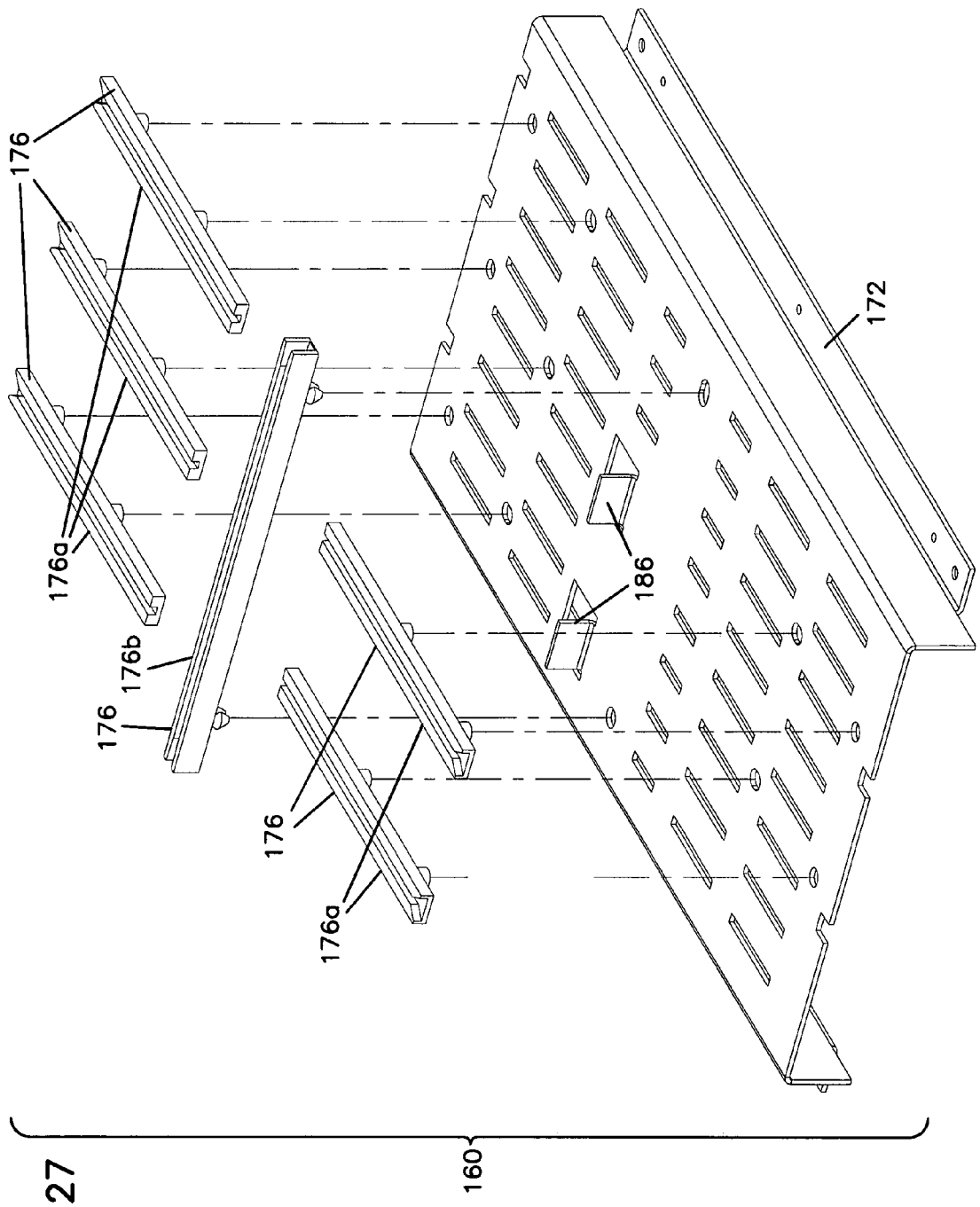
FIG. 27 is a further exploded view of a bottom of the inner chassis assembly of FIG. 26, showing the card guides exploded.
Figure 28:
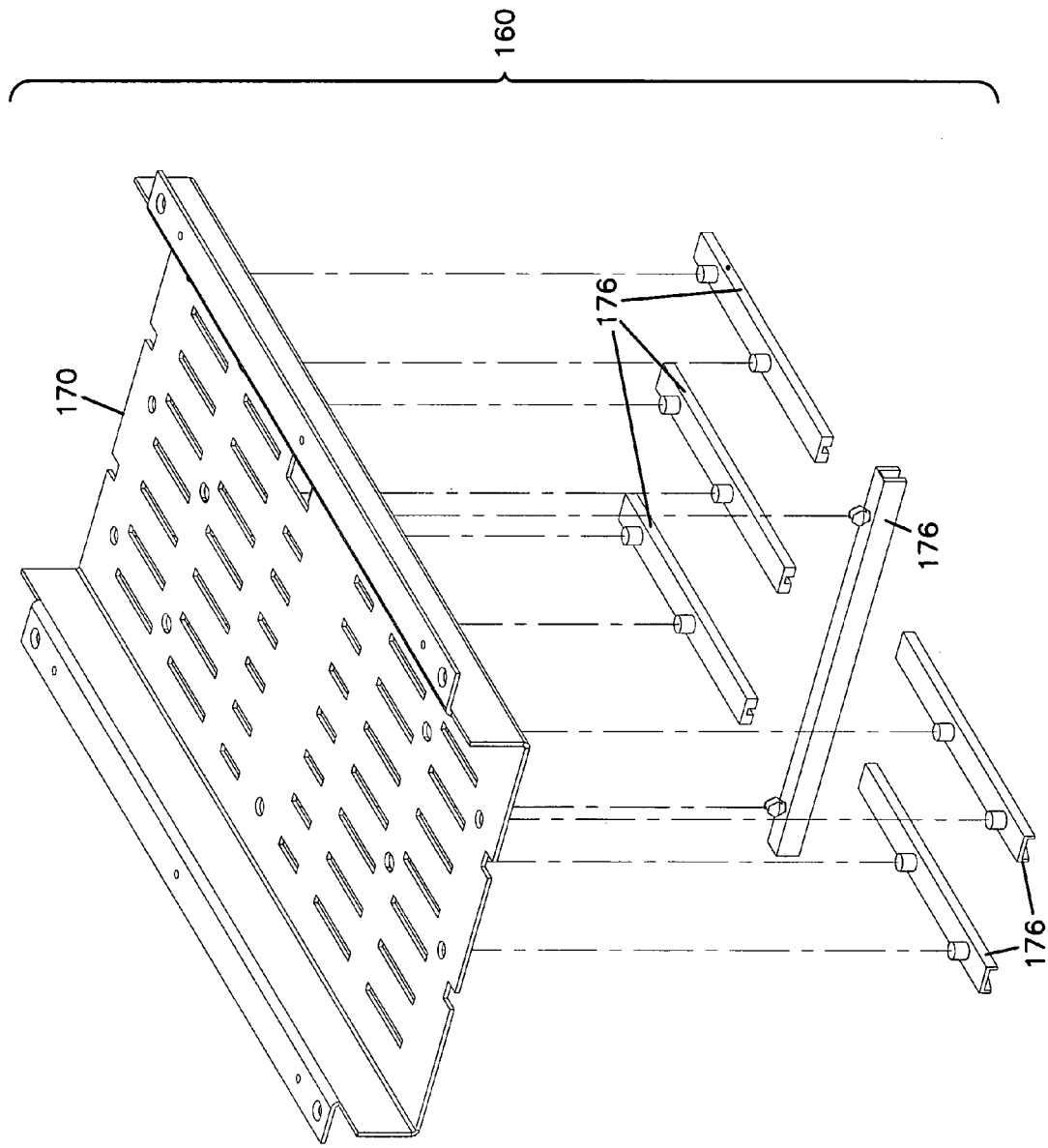
FIG. 28 is a further exploded view of the top of the inner chassis assembly of FIG. 26, showing the card guides exploded.

Preferably, inner chassis assembly 160 can be assembled first including back plane 144, and then received in an opening 145 of main chassis assembly 144, such as shown in FIG. 17.

Cards 124, 126, 128 are provided with mating structures to prevent improper cards inserted into openings 120, 122. For example, cards 124 include intermediate slots 180, and back plane 144 includes posts 182. Cards 126 include lower notches 184, and bottom 172 of inner chassis assembly 160 includes a tab 186. Similarly, card 128 includes an upper notch 188, and top 170 includes a tab 190.

Figure 29:
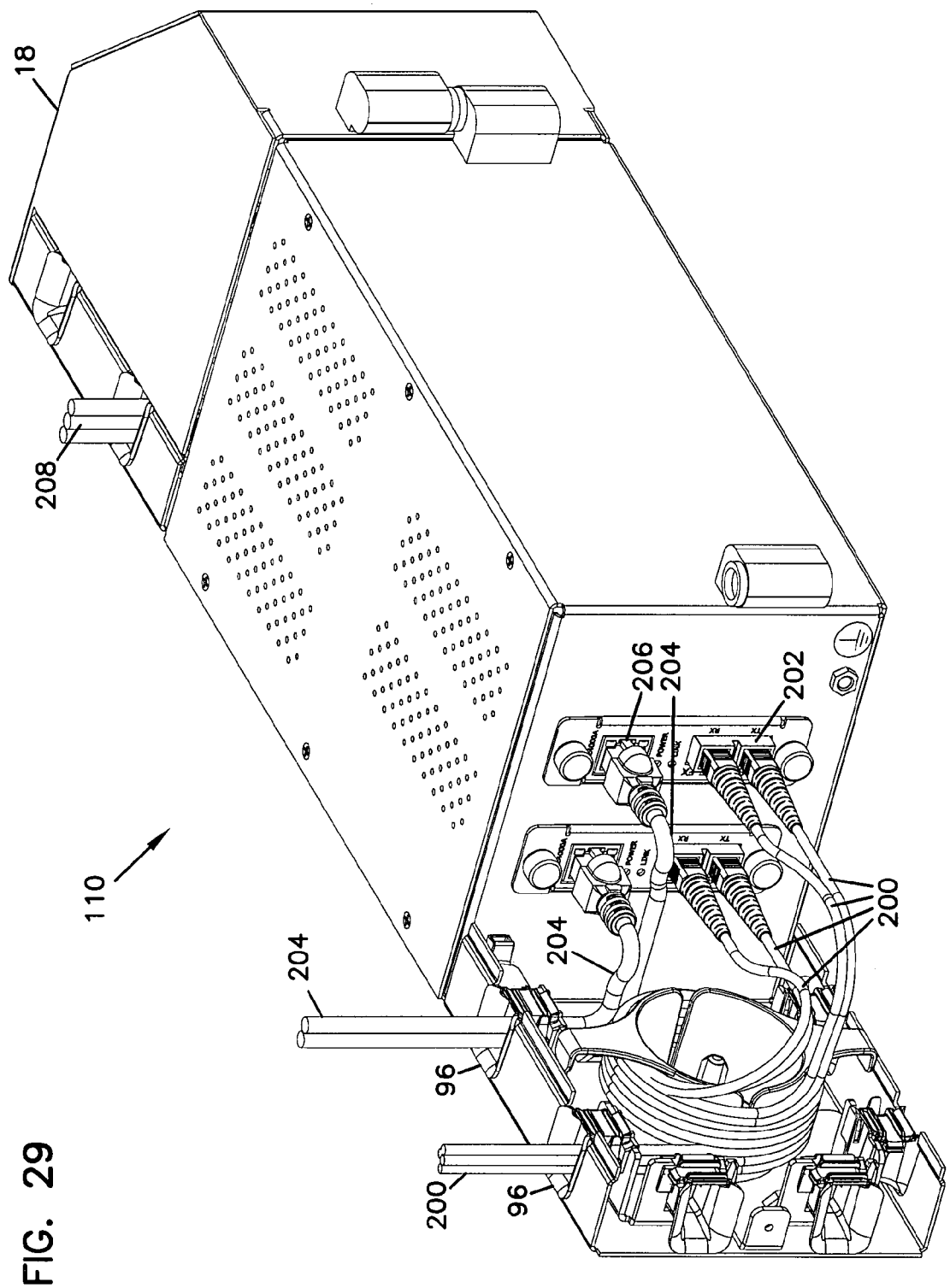
FIG. 29 shows the chassis of FIG. 2 with optical fiber cables and UTP cables connected to the signal converter cards.
Figure 30:
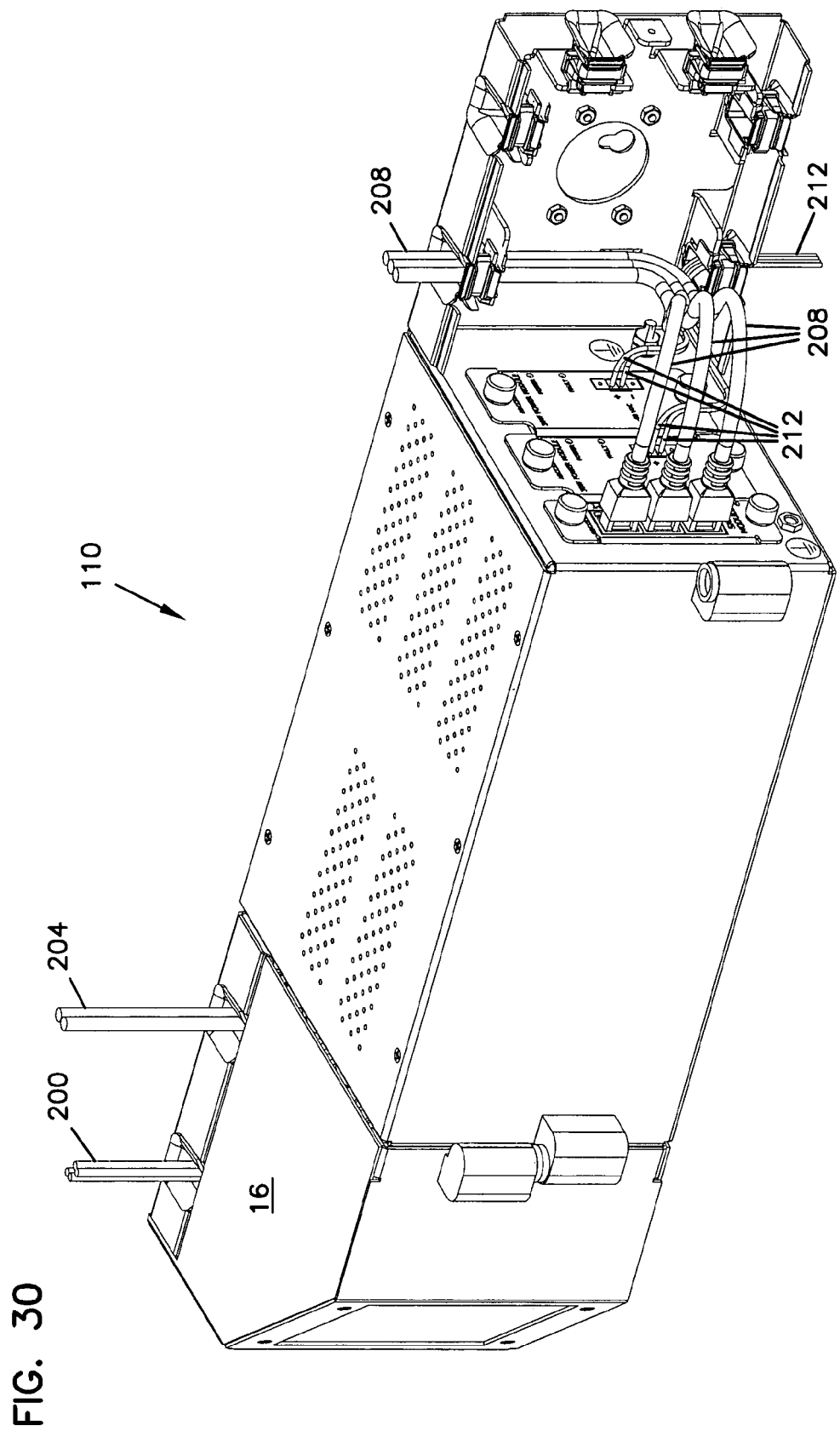
FIG. 30 shows the chassis of FIG. 2 with power cables and UTP cables connected to the power cards and CPU card, respectively.

Referring now to FIGS. 29 and 30, various example cables are shown in position for converting electrical to optical, and optical to electrical. The covers have been removed in FIGS. 29 and 30 from one end in each Figure. As shown in FIG. 29, the fiber optic cables 200 enter through one of cable clips 96 and are positioned around spool 94 to take up slack and connect at front adapters 202 of converter cards 124. Cables 200 are terminated with optical connectors, such as SC type. Electrical cables 204 enter through a different cable clip 96 and are received in jacks 206 of converter cards 124. Cables 204 are terminated with plugs, such as twisted pair RJ45 plugs.

Now with reference to FIG. 30, UTP cables 208 extend through one of cable clips 96 for connection at jacks 210 of CPU card 128. Three ports are shown, such as for IN, OUT, and Ethernet connections.

Power cables 212 enter through another cable clip 96 and connect to power cards 126 at connection locations 214. If desired, lance 11 can be used to tie down cables 208, or cables 212.

Because each of cable clips 96 in openings 24 includes a movable and securable hinged door, the cables can be conveniently positioned in their desired locations, and then covers 16, 18 can be added and pivoted to the closed position, without pinching off or otherwise damaging the cables. Openings 24 are positioned along the top, bottom and side of each extension 42, 44 to provide for flexibility when cables are extended toward chassis 10. Side openings 24a are particularly useful for situations when more than one chassis 10 is provided in a stacked arrangement. Vertical cable guides can be added as desired to vertically manage the cables to and from each chassis 10.

Each end of main housing 14 includes an electrostatic discharge grounding port 230, such as for receiving a banana clip of a technician's grounding cable. Adjacent to power cards 126, main housing 14 also includes a grounding contact 232 for connecting to the chassis ground.

Figure 31:
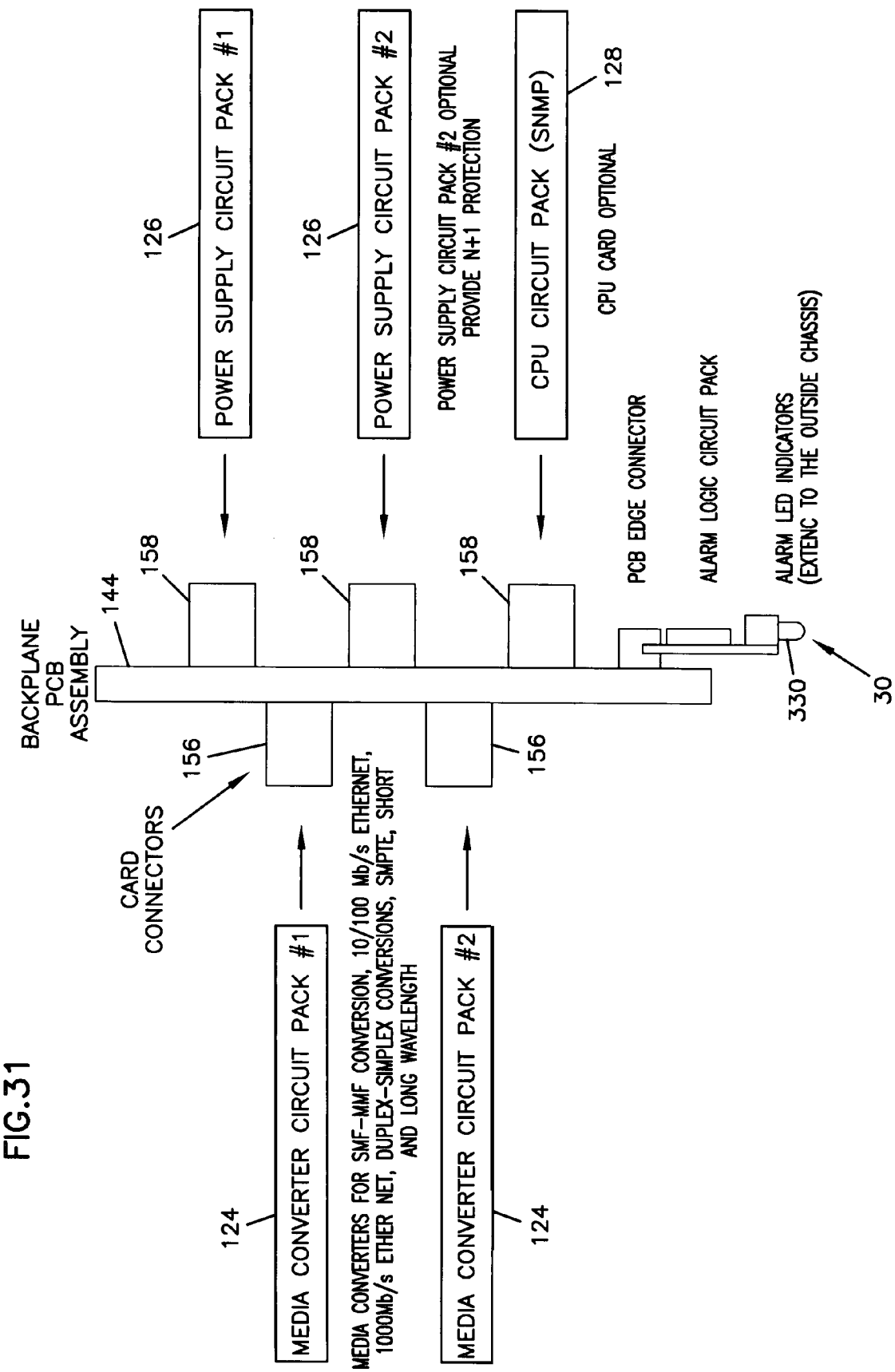
FIG. 31 is a schematic drawing showing the various cards connected to the back plane.

Referring now to FIG. 31, a schematic of the various elements of the internal circuitry is shown. FIG. 31 shows two converter cards 124, main and auxiliary power supply cards 126, and a CPU card 128. FIG. 31 also illustrates visual indicators 330 connected to back plane 144 for providing a visual indicator associated with the front of chassis 10, such as shown in FIG. 1.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of managing telecommunications cables comprising the steps of:
   providing a chassis mounted to a wall and having left and right sides;
   providing signal converter circuitry within the chassis;

extending an electrical signal cable to a selected side from the left and right sides;

extending an optical signal cable to the selected side;

connecting the extended electrical signal cable and the extended optical signal cable to the signal converter circuitry at connection locations that face in a direction generally parallel to either the left or right side of the chassis such that the extended electrical signal cable can be connected to the chassis by accessing only the left or right side of the chassis;

extending a power supply cable to the other side opposite the selected side;

connecting the extended power supply cable to the signal converter circuitry at connection locations that face in a direction generally parallel to either the left or right side of the chassis such that the power supply cable can be connected to the chassis by accessing only the left or right side of the chassis.

2. The method of claim 1, wherein hinged covers are provided, one cover at each of the left and right sides, and further comprising the step of hinging the covers closed to cover each of the left and right sides of the chassis.

3. The method of claim 2, further comprising cable clips, and further comprising the step of clipping each cable to one of the cable clips before hinging the covers to the closed positions.

4. A method of managing telecommunications cables comprising the steps of:

providing a chassis mounted to a wall and having left and right sides;

providing signal converter circuitry within the chassis;

extending an electrical signal cable to a selected side from the left and right sides;

extending an optical signal cable to the selected side;

connecting the extended electrical signal cable and the extended optical signal cable to the signal converter circuitry at connection locations that face in a direction generally parallel to either the left or right side of the chassis such that the extended electrical signal cable can be connected to the chassis by accessing only the left or right side of the chassis;

extending a power supply cable to the other side opposite the selected side;

connecting the extended power supply cable to the signal converter circuitry at connection locations that face in a direction generally parallel to either the left or right side of the chassis such that the power supply cable can be connected to the chassis by accessing only the left or right side of the chassis; and providing one hinged cover at each of the left and right sides, and further comprising the step of hinging the covers closed to cover each of the left and right sides of the chassis.

5. The method of claim 4, further comprising cable clips, and further comprising the step of clipping each cable to one of the cable clips before hinging the covers to the closed positions.

* * * * *